(12) United States Patent
Shibahashi et al.

(10) Patent No.: US 7,575,386 B2
(45) Date of Patent: Aug. 18, 2009

(54) COLOR-MEMORIZING PHOTOCHROMIC WRITING INSTRUMENT, COLOR-MEMORIZING PHOTOCHROMIC WRITING INSTRUMENT SET USING THE SAME AND METHOD FOR ALTERNATELY EXPRESSING COLOR-MEMORIZING PHOTOCHROMIC FUNCTION OF WRITING IMAGE

(75) Inventors: Yutaka Shibahashi, Nagoya (JP); Michiyuki Yasuda, Nagoya (JP); Masahiro Irie, 24-25-706, Muromi 4-chome, Sawara-ku, Fukuoka-shi, Fukuoka (JP)

(73) Assignees: The Pilot Ink Co., Ltd., Aichi (JP); Masahiro Irie, Fukuoka (JP)

( * ) Notice: Subject to any disclaimer, the term of this patent is extended or adjusted under 35 U.S.C. 154(b) by 760 days.

(21) Appl. No.: 11/226,291

(22) Filed: Sep. 15, 2005

(65) Prior Publication Data

US 2006/0053975 A1 Mar. 16, 2006

(30) Foreign Application Priority Data

Sep. 15, 2004 (JP) .......................... P. 2004-267639
Aug. 8, 2005 (JP) .......................... P. 2005-229656

(51) Int. Cl.
*B43K 5/00* (2006.01)
(52) U.S. Cl. ....................................... 401/199; 401/142
(58) Field of Classification Search ......... 401/198–196, 401/141–142
See application file for complete search history.

(56) References Cited

U.S. PATENT DOCUMENTS

| 5,527,385 | A | * | 6/1996 | Sumii et al. ............... 106/31.17 |
| 7,494,537 | B2 | * | 2/2009 | Ono et al. ................. 106/31.16 |
| 2003/0118924 | A1 | | 6/2003 | Kim et al. |
| 2007/0211124 | A1 | * | 9/2007 | Iftime et al. ................. 347/100 |

FOREIGN PATENT DOCUMENTS

| DE | 102 42 435 A1 | 3/2004 |
| JP | 8-156479 A | 6/1996 |
| WO | WO 2004/041961 A1 | 5/2004 |

OTHER PUBLICATIONS

Hisataka Nakashima et al., "Synthesis of Polystyrene and Poly(alkyl methacrylate)s Having Photochromic Dithienylethene Pendant Groups" (1998) Polymer Journal, vol. 30, No. 12, pp. 985-989.
Masahiro Irie et al., "Photochromism of Diarylethenes Having Thiophene Oligomers as the Aryl Groups" (1997) Tetrahedron, vol. 53, No. 36, pp. 12263-12271.
European Search Report dated Nov. 15, 2005.

* cited by examiner

*Primary Examiner*—Huyen Le
(74) *Attorney, Agent, or Firm*—Sughrue Mion, PLLC

(57) ABSTRACT

A color-memorizing photochromic writing instrument, which comprises a writing tip portion connected to a light-shielding tubular member or refill; and a color-memorizing photochromic ink, wherein the ink is prepared by dissolving, dispersing or suspending a diarylethene photochromic compound in a vehicle containing at least a solvent and a binder, wherein the diarylethene photochromic compound is in a coloring state, and a color-memorizing photochromic writing instrument set comprising the writing instrument and a color-changing means.

15 Claims, 2 Drawing Sheets

COLOR-MEMORIZING PHOTOCHROMIC WRITING INSTRUMENT, COLOR-MEMORIZING PHOTOCHROMIC WRITING INSTRUMENT SET USING THE SAME AND METHOD FOR ALTERNATELY EXPRESSING COLOR-MEMORIZING PHOTOCHROMIC FUNCTION OF WRITING IMAGE

FIELD OF THE INVENTION

The present invention relates to a color-memorizing photochromic writing instrument, a color-memorizing photochromic writing instrument set using the same and a method for alternately expressing a color-memorizing photochromic function of a writing image. More particularly, it relates to a color-memorizing photochromic writing instrument, which is filled with an ink containing a photochromic compound exhibiting a coloring state by irradiation with ultraviolet rays or sunlight containing ultraviolet rays, and can make a handwriting which is hardly decolored or discolored under normal conditions, but can be discolored from colored to colorless or from color (1) to another color (2) by means of a specific color-changing means, and can return to the original as needed by irradiating the handwriting with ultraviolet rays or sunlight containing ultraviolet rays again, a color-memorizing photochromic writing instrument set using the same and a method for alternately expressing a color-memorizing photochromic function of a writing image.

BACKGROUND ART

Conventionally, as an ink for writing instrument for forming an image which changes color, those utilizing a photochromic material (e.g., Patent Document 1) are known.

A writing image formed with such an ink utilizing a photochromic material is allowed to develop color by irradiation with sunlight and maintains the coloring state under the irradiation with sunlight. However, when it is left at a place which is not irradiated with sunlight, the coloring state is not maintained, and it is spontaneously decolored reversibly to return the original handwriting, and under normal conditions, the coloring state is not maintained, therefore, the handwriting at writing could not be confirmed visually.

[Patent Document 1]
  JP-A-8-156479

SUMMARY OF THE INVENTION

The present inventors found that, during the process of examining applicability of thermally irreversible photochromic compounds considered to be necessary for optical memory (a color-memorizing photochromic property), a diarylethene photochromic compound is remarkably excellent in color-memorizing property for maintaining a coloring state, thermal stability, sensitivity, repetition durability and the like and is effective as a photochromic agent for an ink for a writing instrument for giving a color-memorizing photochromic handwriting, and a writing instrument accommodating an ink prepared by dissolving, dispersing or suspending the photochromic agent is effective.

The present invention intends to provide a color-memorizing photochromic writing instrument, which is filled with an ink in a coloring state by irradiation with ultraviolet rays or sunlight containing ultraviolet rays in advance, does not cause a problem of discoloring a handwriting formed by the writing instrument in a place which is not irradiated with sunlight unlike a conventional photochromic material, has a function to visually confirm a handwriting by maintaining a coloring state in normal using conditions, and can decolor the handwriting or discolor it to another color as needed by applying a color-changing means to the handwriting, a color-memorizing photochromic writing instrument set using the same and a method for alternately expressing a color-memorizing photochromic function of a writing image.

A requirement of the present invention is a color-memorizing photochromic writing instrument, comprising a writing tip portion connected directly or via a connecting member to a light-shielding tubular member or refill and accommodating therein a color-memorizing photochromic ink prepared by dissolving, dispersing or suspending a diarylethene photochromic compound as a photochromic agent in a vehicle containing at least a solvent and a binder, in which the diarylethene photochromic compound is in a coloring state.

Another requirement is that the vehicle has a light reflectance of a dry coating film in the wavelength range from 350 nm to 400 nm of 20% or more; the photochromic agent is a microcapsule pigment in which the diarylethene photochromic compound is encapsulated or a resin particle containing the diarylethene photochromic compound; a non-photochromic dye or pigment is contained in the color-memorizing photochromic ink; the pigment is a luster pigment; the writing tip portion is a ballpoint pen tip, and a shear-thinning imparting agent is contained in the color-memorizing photochromic ink; the writing tip portion is a marking pen tip made of a fiber work, and a water-soluble polymer flocculating agent for suspending the microcapsule pigments in which the diarylethene photochromic compound is encapsulated or the resin particles containing the diarylethene photochromic compound in a mildly cohesive state is contained in the color-memorizing photochromic ink; an ink absorber made of a fiber bundle is accommodated in the tubular member, and the ink absorber is impregnated with the color-memorizing photochromic ink; the color-memorizing photochromic writing instrument further comprises a light-shielding cap; or the like.

Another requirement is a color-memorizing photochromic writing instrument set comprising the color-memorizing photochromic writing instrument and a color-changing means for erasing a handwriting formed with the writing instrument which contains an ultraviolet ray absorbent and/or a light-shielding pigment for shielding at least ultraviolet rays.

Another requirement is that the color-changing means is a sheet prepared by integrally blending the ultraviolet ray absorbent and/or the light-shielding pigment for shielding ultraviolet rays with a transparent substrate, or a sheet prepared by providing a printing or coating layer in which the ultraviolet ray absorbent and/or the light-shielding pigment for shielding ultraviolet rays are/is fixed in a binder resin in a dissolved or dispersed state on a surface of a transparent substrate; an adhesive layer is provided on the lower layer of the sheet; the color-changing means is prepared by providing an adhesive layer containing the ultraviolet ray absorbent and/or the light-shielding pigment for shielding ultraviolet rays on the lower layer of a transparent sheet; the color-changing means is a fluid in which the ultraviolet ray absorbent and/or the light-shielding pigment for shielding ultraviolet rays are/is dissolved or dispersed; or the like.

Another requirement is a method for alternately expressing a color-memorizing photochromic function of a writing image, comprising expressing a function to alternately memorize and maintain coloring and decoloring states by arranging a color-changing means, which contains an ultraviolet ray absorbent and/or a light-shielding pigment for shielding ultraviolet rays, cuts off ultraviolet rays of sunlight thereby effecting irradiation with visible light, in a contacted or uncontacted state to a photochromic writing image formed on a surface for writing with a color-memorizing photochromic writing instrument comprising a writing tip portion connected directly or via a connecting member to a light-shielding tubular member or refill and accommodating therein a color-memorizing photochromic ink prepared by dissolving, dispersing or suspending a diarylethene photochromic compound as a photochromic agent in a vehicle containing at least a solvent and a binder, in which the diarylethene photochromic compound is in the coloring state, whereby the writing image in a coloring state is changed to a decoloring state and maintained the changed state.

The present invention can provide a color-memorizing photochromic writing instrument which can make a colored handwriting by writing, which has color retention, namely a property of hardly being decolored or discolored under normal conditions thereby satisfying the distinguishing property of the handwriting, but can be decolored or discolored to another color by applying a color-changing means to the handwriting, and have a function to return to the original by irradiating the handwriting with ultraviolet rays or sunlight containing ultraviolet rays again, thereby having applicability in various fields such as application to felt-tip pens, toys, and also studying and information communication, a color-memorizing photochromic writing instrument set using the same and a method for alternately expressing a color-memorizing photochromic function of a writing image.

Figure 1:
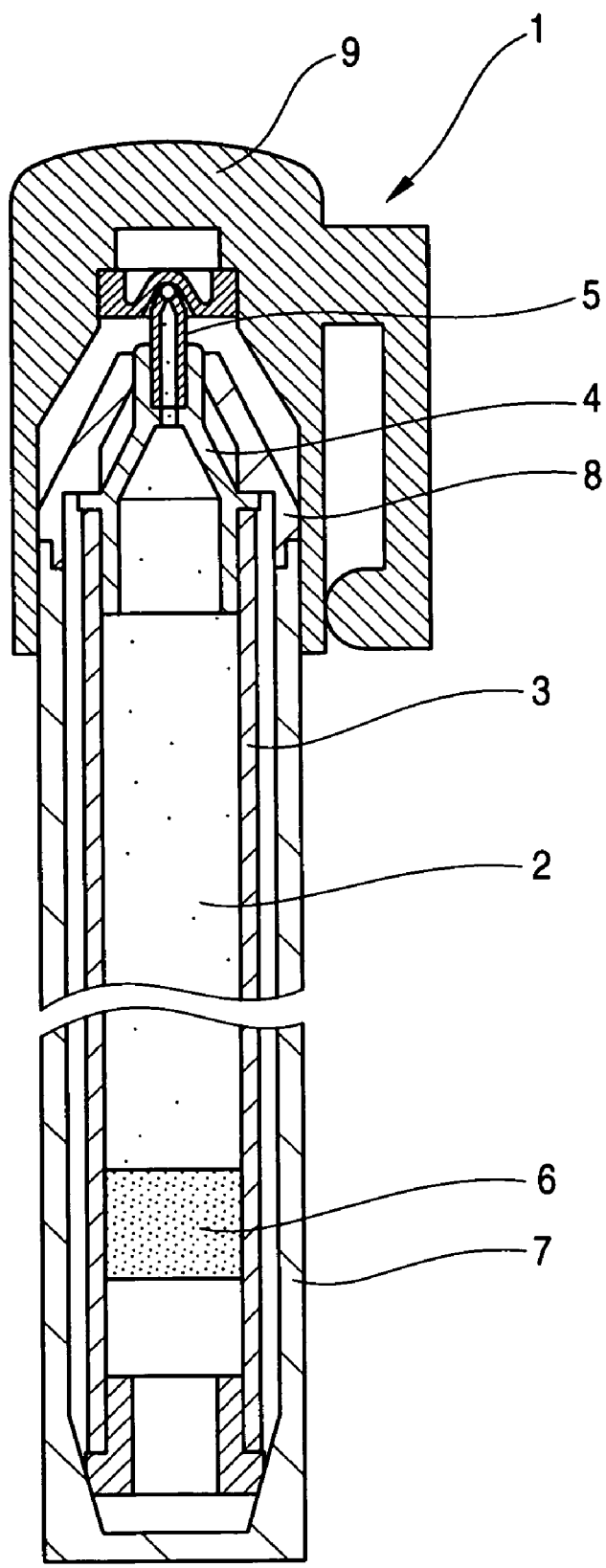
FIG. 1 is an explanatory longitudinal sectional view showing a color-memorizing photochromic writing instrument in the form of a ballpoint pen of the present invention.

The Reference Numerals and Signs in the Figs. are described as follows.
1. Color-memorizing photochromic writing instrument
2. Ink
3. Ink container
4. Connecting member
5. Ballpoint pen tip
6. Ink follower
7. Tubular member
8. Mouth ring
9. Cap
10. Ink absorber
11. Marking pen tip

DETAILED DESCRIPTION OF THE INVENTION

Examples of the aforementioned diarylethene photochromic compound are shown below, however, the diarylethene photochromic compound to be used in the present invention is not limited to the following compounds.

As the basic skeleton of the diarylethene photochromic compound, compounds represented by the formula (1) can be exemplified.

(1)

Ring A of the aforementioned formula (1) represents a hydrocarbon ring or a heterocyclic ring, which may be fluorinated or perfluorinated.

The compounds represented by the aforementioned formula (1) are specifically illustrated with reference to the formula (2) or (3).

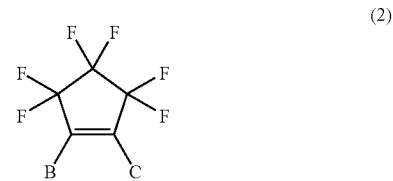

(2)

The compounds represented by the aforementioned formula (2) have a ring which contains 5 carbon atoms and may be fluorinated or perfluorinated.

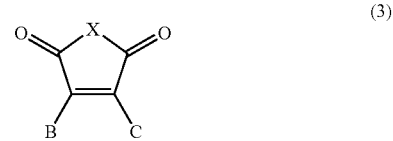

(3)

In the compounds represented by the aforementioned formula (3), an anhydrous ring containing 4 carbon atoms is formed, and X represents an oxygen atom or an NR group (wherein R is an alkyl group and/or a hydroxyl alkyl group having from 2 to 16 carbon atoms).

In addition, compounds represented by the formula (4) can be exemplified as the basic skeleton of another diarylethene photochromic compound.

(4)

Group A1 and group A2 of the compounds represented by the aforementioned formula (4) always take the cis-form against the double bond, and each independently represents a substituted or unsubstituted alkyl group, a fatty acid ester group or a nitrile group.

The compounds represented by the aforementioned formula (4) are specifically illustrated with reference to the formulae (5) and (6).

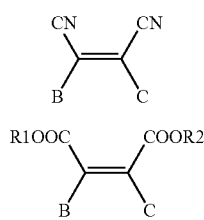

(5)

(6)

R1 and R2 of the compounds represented by the aforementioned formula (6) represents a methyl group or an ethyl group.

Group B and group C in the compounds represented by the aforementioned formulae (1) to (6) may be the same or different from each other, and groups represented by the following structural formulae can be exemplified.

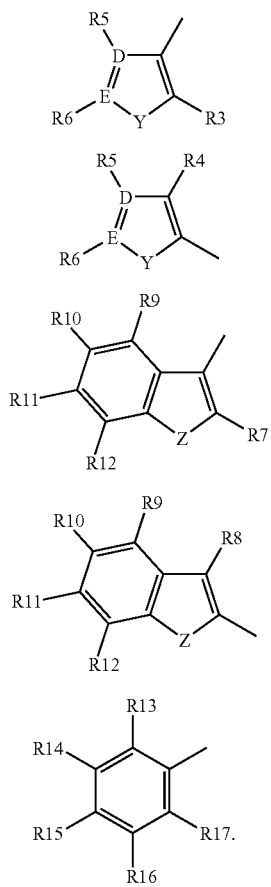

(7)

(8)

(9)

(10)

(11)

(In these formulae, Y and Z may be the sane or different from each other and each represents an oxygen atom, a sulfur atom or an oxidized form of sulfur, nitrogen or selenium, D and E may be the same or different from each other and each represents a carbon atom or a nitrogen atom, R3 to R17 may be the same or different from one another and each represents hydrogen, a linear or branched chain alkyl or alkoxy group having from 1 to 16 carbon atoms, a halogen atom, a linear or branched chain fluoro or perfluoro group having from 1 to 4 carbon atoms, a carboxylate group, an alkyl carboxylate group having from 1 to 16 carbon atoms, a mono- or di-alkylamino group having from 1 to 16 carbon atoms, a nitrile group, a phenyl group, a naphthalene group or a heterocyclic compound (pyridine, quinoline, thiophene, furan, indole, pyrrole, selenophene, thiazole, benzothiophene or the like). However, when D and E are a nitrogen atom, R5 and R6 are not present. Between the double bond and groups B and C, a group other than hydrogen, for example, $CH_3$, CN or $CO_3C_2H_6$, must always be present at the ortho position against the bond, R3 or R4 must be other than hydrogen, and R7 or R8 must be other than hydrogen in the same manner. Regarding R13 to R17, they may be a naphthalene skeleton formed by bonding the ring with an adjacent group.)

More specific examples of the aforementioned group B and group C include the following compounds.

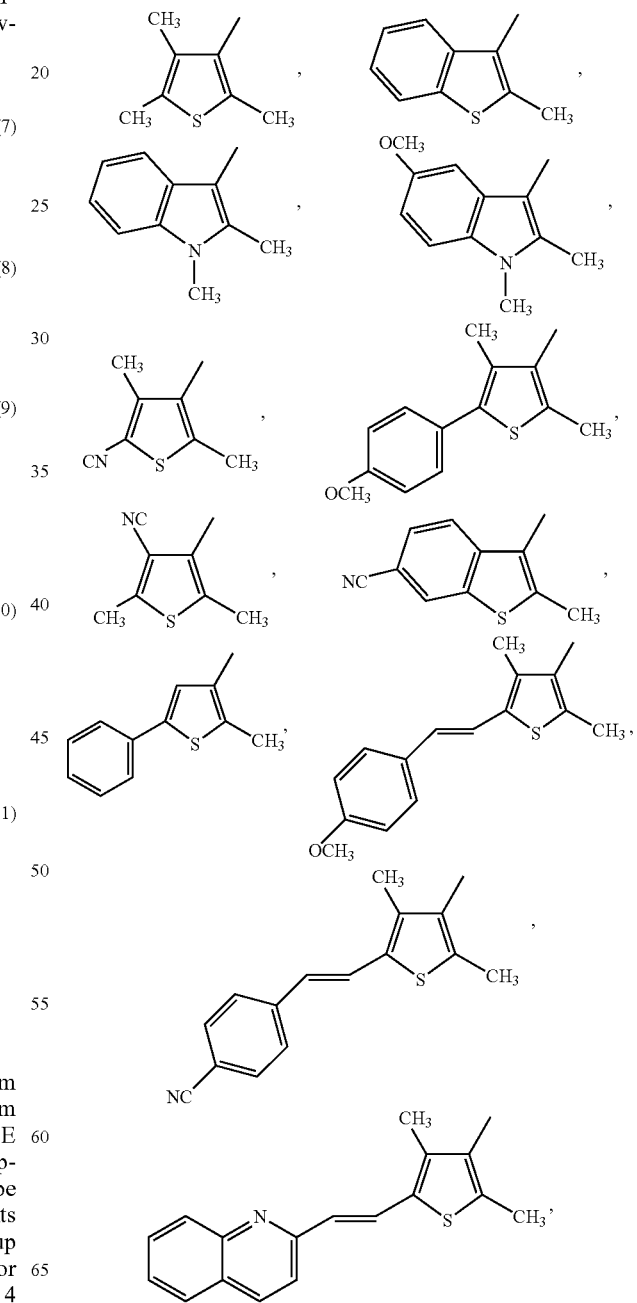

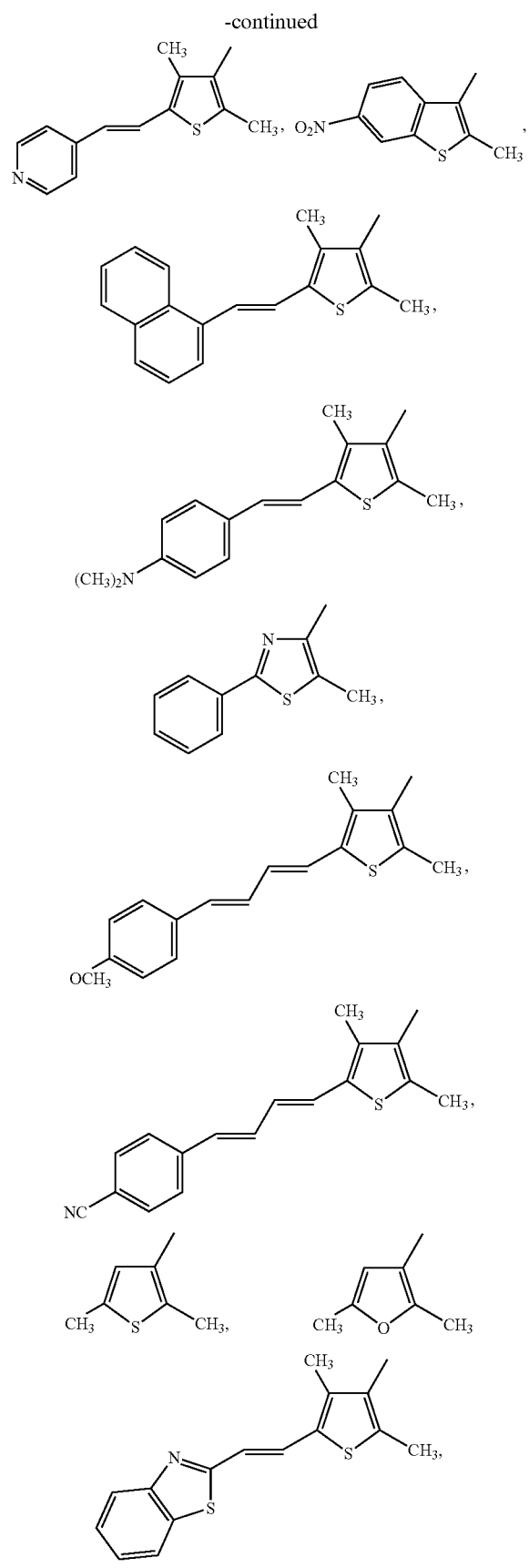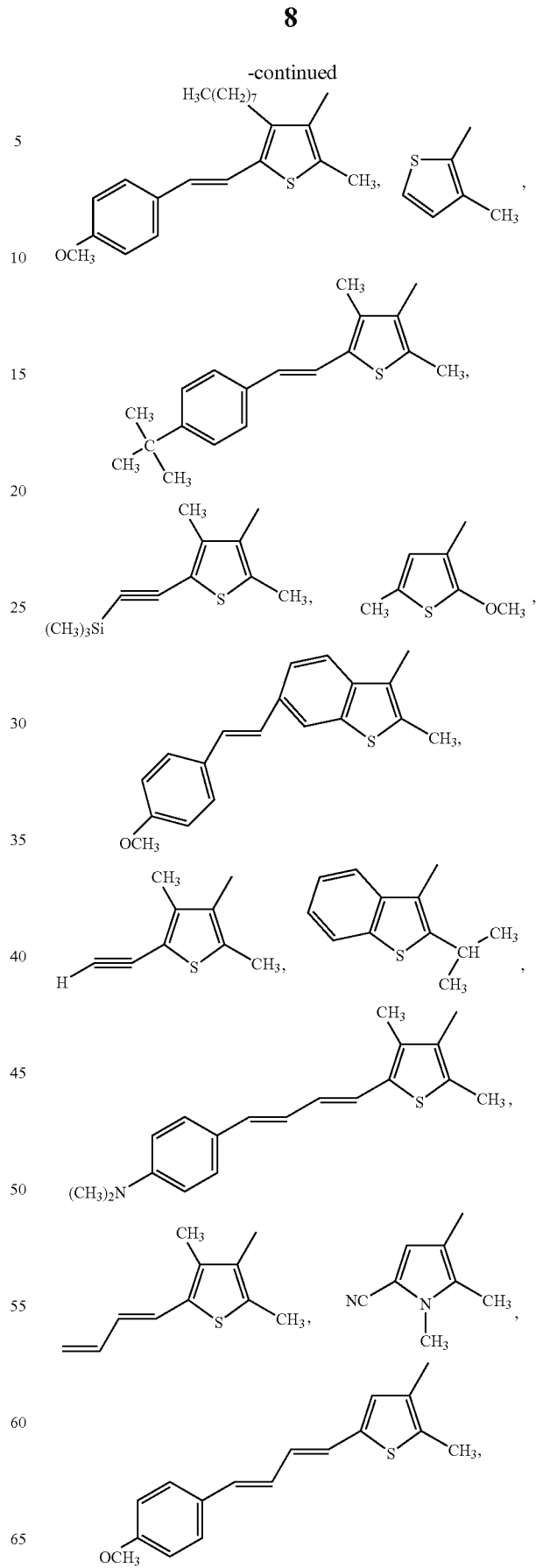

-continued

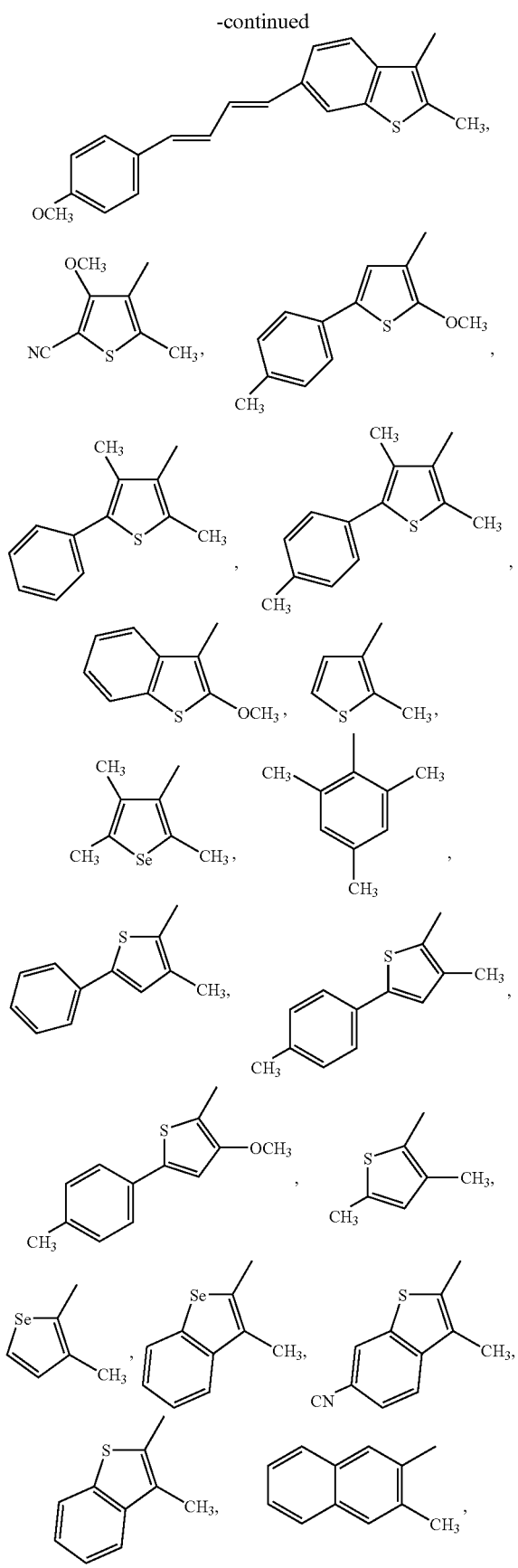

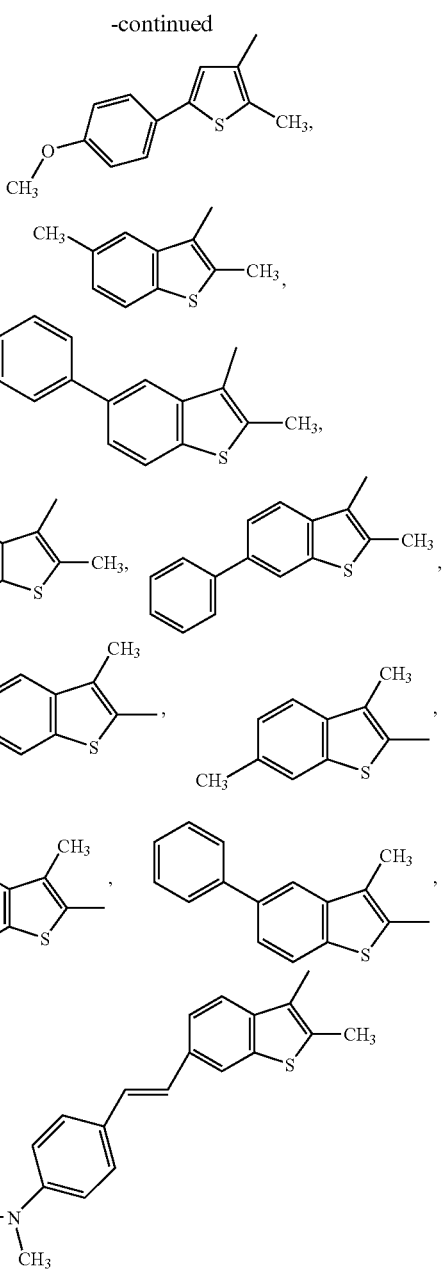

Further illustrating the compounds represented by the aforementioned formula (2) or (3), as a maleic anhydride compound, 3,4-bis(1,2-dimethyl-3-indolyl) furan-2,5-dion, 3,4-di(2-methyl-3-benzothiophene) furan-2,5-dion and the like can be exemplified.

As a cyclopentene compound, 1-(1,2-dimethylindolyl)-2-(2-cyano-3,5-dimethyl-4-thienyl)-3,3,4,4,5,5-hexafluorocyclopentene, 1-(1,2-dimethyl-3-indolyl)-2-(3-cyano-2,5-dimethyl-4-thienyl)-3,3,4,4,5,5-hexafluorocyclopentene, 1-(1,2-dimethyl-3-indolyl)-2-(2-methyl-3-benzothienyl)-3,3,4,4,5,5-hexafluorocyclopentene, 1,2-bis(5-(4-methoxyphenyl)-2,4-dimethyl-3-thienyl)-3,3,4,4,5,5-hexafluorocyclopentene, 1,2-bis(5-(2-(4-methoxyphenyl)-1-ethenyl)-2,4-dimethyl-3-thienyl)-3,3,4,4,5,5-hexafluorocyclopentene, 1,2-bis(5-(2-(4-cyanophenyl)-1-ethenyl)-2,4-dimethyl-3-thienyl)-3,3, 4 4,5,5-hexafluorocyclopentene, 1,2-bis(2,4-dimethyl-5-(2-(2- quinolyl)-1-ethenyl)-3-thienyl)-3,3,4,4,5,5-hexafluorocyclopentene, 1,2-bis(2,4-dimethyl-5-(2-(4-pyridyl)-1-ethenyl)-3-thienyl)-3,3,4,4,5,5-hexafluorocyclopentene, 1,2-bis(2,4-dimethyl-5-(2-(1-naphthyl)-1-ethenyl)-3-thienyl)-3,3,4,4,5,5-hexafluorocyclopentene, 1,2-bis(5-(2-(4-methoxyphenyl)-1-ethenyl)-2-methyl-4-octyl-3-thienyl)-3,3,4,4,5,5-hexafluorocyclopentene, 1,2-bis(5-(2-(4-t-butylphenyl)-1-ethenyl)-2,4-dimethyl-3-thienyl)-3,3,4,4,5,5-hexafluorocyclopentene, 1,2-bis(2,4-dimethyl-5-(2-(2-benzothiazyl)-1-ethenyl)-3-thienyl)-3,3,4,4,5,5-hexafluorocyclopentene, 1-(6-(2-(4-methoxyphenyl)-1-ethenyl)-2-methyl-3-benzothienyl)-2-(5-(4-(4-dimethylaminophenyl)-1,3-butadienyl)2,4-dimethyl-3-thienyl)-3,3,4,4,5,5-hexafluorocyclopentene, 1-(6-(4-(4-methoxyphenyl)-1,3-butadienyl)-2-methyl-3-benzothienyl)-2-(5-(4-(4-methoxyphenyl)-1,3-butadienyl)-2,4-dimethyl-3-thienyl)-3,3,4,4,5,5-hexafluorocyclopentene, 1,2-bis(6-(4-(4-methoxyphenyl)-1,3-butadienyl)-2-methyl-3-benzothienyl)-3,3,4,4,5,5-hexafluorocyclopentene, 1,2-bis(6-(2-(4-methoxyphenyl)-1-ethenyl)-2-methyl-3-benzothienyl)-3,3,4,4,5,5-hexafluorocyclopentene, 1-(6-(2-(4-dimethylaminophenyl)-1-ethenyl)-2-methyl-3-benzothienyl)-2-(5-(2-(4-cyanophenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(5-(2-(4-cyanohenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(5-(2-(4-methoxyphenyl)-1-ethenyl)-2,4-dimethyl-3-thienyl)-3,3,4,4,5,5-hexafluorocycloentene, 1-(6-(4-(4-methoxyphenyl)-1,3-butadienyl)-2-methyl-3-benzothienyl)-2-(5-(2-(4-methoxyphenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(2,4-dimethyl-(S-(4-(4-methoxyphenyl)-1,3-butadienyl)-3-thienyl)-3,3,4,4,5,5-hexafluorocyclopentene, 1-(1,2-dimethyl-3-indolyl)-2-(2-cyano-3-methoxy-5-methylthienyl)-3,3,4,4,5,5-hexafluorocyclopentene, 1,2-bis(2-methyl-5-phenyl-3-thienyl)-3,3,4,4,5,5-hexafluorocyclopentene, 1,2-bis (2,4-dimethyl-5-phenyl-3-thienyl)-3,3,4,4,5,5-hexafluorocyclopentene, 1,2-bis(2-phenyl-5-methyl-4-thiazoyl)-3,3,4,4,5,5-hexafluorocyclopentene, 1,2-bis(2-methylbenzothiophen-3-yl)-3,3,4,4,5,5-hexafluorocyclopentene, 1,2-bis(3-methylbenzothiophen-2-yl)-3,3,4,4,5,5-hexafluorocyclopentene, 1,2-bis(3-methyl-2-thienyl)-3,3,4,4,5,5-hexafluorocyclopentene, 1,2-bis(2-methyl-6-nitro-3-benzothienyl)-3,3,4,4,5,5-hexafluorocyclopentene, 1-(3-methyl-2-thienyl)-2-(2-methyl-3-thienyl)-3,3,4,4,5,5-hexafluorocyclopentene, 1,2-bis (5-(4-methylphenyl)-2-methyl-3-thienyl)-3,3,4,4,5,5-hexafluorocyclopentene, 1-(2,4-dimethyl-5-phenyl-3-thienyl)-2-(2-methyl-5-phenyl-3-thienyl)-3,3,4,4,5,5-hexafluorocyclopentene, 1,2-bis(2,4-dimethyl-5-(4-methoxyphenyl)-3-thienyl)-3,3,4,4,5,5-hexafluorocyclopentene, 1-(2-methyl-5-(4-methylphenyl)-3-thienyl)-2-(2,4-di-methyl-5-(4-methylphenyl)-3-thienyl)-3,3,4,4,5,5-hexafluorocyclopentene, 1-(2-methyl-5-(4-methoxyphenyl)-3-thienyl)-2-(2,4-dimethyl-5-(4-methoxyphenyl)-3-thienyl)-3,3,4,4,5,5-hexafluorocyclopentene, 1-(3-methyl-2-thienyl)-2-(5-methyl-2-phenyl-4-thiazoyl)-3,3,4,4,5,5-hexafluorocyclopentene, 1-(3-methylbenzothiophen-2-yl)-2-(5-methyl-2-phenyl-4-thiazoyl)-3,3,4,4,5,5-hexafluorocyclopentene, 1-(2-methylbenzothiophen-3-yl)-2-(5-methyl-2-phenyl-4-thiazoyl)-3,3,4,4,5,5-hexafluorocyclopentene, 1-(2-methyl-5-methylbenzothiophen-3-yl)-2-(5-methyl-2-phenyl-4-thiazoyl)-3,3,4,4,5,5-hexafluorocyclopentene, 1-(2-methyl-5-phenyl-benzothiophen-3-yl)-2-(5-methyl-2-phenyl-4-thiazoyl)-3,3,4,4,5,5-hexafluorocyclopentene, 1-(3-methyl-5-methyl-benzothiophen-2-yl)-2-(5-methyl-2-phenyl-4-thiazoyl)-3,3,4,4,5,5-hexafluorocyclopentene, 1-(3-methyl-5-phenyl-benzothiophen-2-yl)-2-(5-methyl-2-phenyl-4-thiazoyl)-3,3,4,4,5,5-hexafluorocyclopentene, 1-(3-methyl-6-methyl-benzothiophen-2-yl)-2-(5-methyl-2-phenyl-4-thiazoyl)-3,3,4,4,5,5-hexafluoro-cyclopentene, 1-(3-methyl-6-phenyl-benzothiophen-2-yl)-2-(5-methyl-2-phenyl-4-thiazoyl)-3,3,4,4,5,5-hexafluorocyclopentene, 1-(2-methyl-6-methylbenzothiophen-3-yl)-2-(5-methyl-2-phenyl-4-thiazoyl)-3,3,4,4,5,5-hexafluorocyclopentene, 1-(2-methyl-6-phenyl-benzothiophen-3-yl)-2-(5-methyl-2-phenyl-4-thiazoyl)-3,3,4,4,5,5-hexafluorocyclopentene, and the like can be exemplified.

Further illustrating the compounds represented by the aforementioned formula (5) or (6), as a maleic acid compound include dimethyl 2,3-di(2-methylbenzothienyl)-maleate and the like can be exemplified.

As a dicyanoethylene compound, 1,2-bis(2,3,5-trimethyl-4-thienyl)-1,2-dicyanoethylene, 1,2-bis(2-methyl-3-benzothienyl)-1,2-dicyanoethylene and the like can be exemplified.

The aforementioned diarylethene photochromic compound can be subjected to practical use as its direct dye form, as a resin particle containing the aforementioned compound or as a microcapsule pigment obtained by encapsulating the aforementioned compound in a microcapsule. A color-memorizing photochromic ink composition is prepared by blending the compound in a water-based or oil-based vehicle, and a color-memorizing photochromic writing instrument is formed by accommodating the ink composition therein.

The aforementioned microcapsule pigment can be obtained by an appropriate method such as a conventionally known interfacial polymerization, in situ polymerization, submerged interfacial polymerization or spray drying, and those having a particle diameter of approximately from 0.5 to 30 µm, preferably from 0.5 to 10 µm, are effective in terms of dispersibility, durability and workability.

The aforementioned diarylethene photochromic compound can be contained in the ink in the range from 0.5 to 50% by weight, preferably from 1 to 40% by weight, which satisfies a visual effect.

When the content is less than 0.5% by weight, it is difficult for the ink to sufficiently express a visual effect by photochromism due to low coloring concentration. On the other hand, even if the compound is added at a content of more than 50% by weight, the coloring concentration corresponding to the content is hardly obtained.

In this connection, by allowing the ink to contain a non-photochromic dye or pigment, the color can be changed from color (1) to another color (2).

Further, by applying a metallic luster pigment as the aforementioned pigment, particularly in a system of discoloring from colorless to colored, luster appearance is imparted to a colorless handwriting thereby giving it a distinguishing property, and luster feeling can be imparted to a colored handwriting.

The aforementioned metallic luster pigment is shown below.

Examples of the metallic luster pigment include aluminum powder, tin powder, lead powder, zinc powder, stainless steel powder, nickel powder, iron powder, copper powder, copper alloy powder, tin/lead/zinc/solder powder, brass powder, gold powder and silver powder, those obtained by coating the surface of natural mica, a synthetic mica, glass, alumina, aluminum or an iron oxide as a core material with a metal oxide such as titanium, zirconium, chromium, vanadium or iron, those obtained by finely powdering a multilayer film, those obtained by finely powdering a transparent film on which aluminum is deposited, those obtained by finely powdering a hologram film on which aluminum is deposited, those which are cholesteric liquid crystal type and the like.

As the metallic luster pigment containing natural mica as a core material, those obtained by coating the surface of natural mica with a metal oxide mainly composed of a titanium oxide and/or an iron oxide with an average thickness of from 0.1 to 5 μm and with an average particle diameter of from 2 to 300 μm are effective.

The pigment exhibits gold, silver or a metallic color depending on the coverage of the metal oxide. In this connection, the average particle diameter indicates an average particle diameter measured by laser diffraction analysis and is a particle diameter corresponding to 50% of the cumulative distribution of the median diameter on a volume basis.

Specific examples of the metallic luster pigment obtained by coating the surface of natural mica with a metal oxide include "Iriodin" (trade name) manufactured by Merck Co., catalogue number: 100 (10 to 60 μm; silver), 103 (10 to 50 μm: silver), 111 (15 μm or less: silver), 120 (5 to 20 μm: silver), 151 (5 to 100 μm: silver), 153 (30 to 100 μm: silver), 163 (40 to 200 μm: silver), 201 (5 to 50 μm: gold), 205 (10 to 60 μm: gold), 249 (10 to 100 μm: gold), 215 (10 to 60 μm: red-violet), 217 (10 to 60 μm: red-copper) 219 (10 to 60 μm; violet), 225 (10 to 60 μm: blue), 235 (10 to 60 μm: green), 300 (10 to 60 μm: gold), 302 (5 to 20 μm: gold), 320 (10 to 60 μm: gold), 351 (5 to 100 μm: gold), 355 (30 to 100 μm: gold), 500 (10 to 60 μm: gold), 504 (10 to 60 μm: red-gold), 520 (5 to 20 μm: gold) and 530 (10 to 100 μm: gold); "Mearlin" (trade name) manufactured by Engelhard Co., catalogue number: Magna Pearl 3000 (2 to 10 μm: silver), Satin White 9130F (4 to 32 μm: silver), Super White. 9020C (6 to 48 μm; silver), Magna Pearl 1000 (8 to 48 μm: silver), Sparkle 9110P (10 to 110 μm: silver), Super Sparkle 9110S (10 to 150 μm: silver), Hilite Super Gold 9230Z (6 to 48 μm: gold), Hilite Super Red 9430Z (6 to 48 μm: red), Hilite Super Green 9830Z (6 to 48 μm: green), Hilite Super Orange 9330Z (6 to 48 μm: orange), Hilite Super Violet 95302 (6 to 48 μm: violet) and Hilite Super Blue 9630Z (6 to 48 μm: blue); "Lumina" (trade name) manufactured by Engelhard Co., catalogue number: gold (10 to 48 μm: gold), red (10 to 48 μm: red), red-blue (10 to 48 μm: violet), aqua-blue (10 to 48 μm: blue), turquoise (10 to 48 μm: blue-green) and green (10 to 48 μm: green) and the like.

Incidentally, the information in the parentheses in the catalogue numbers indicates the average particle diameter and the color of each pigment.

As the metallic luster pigment containing a synthetic mica as a core material, those obtained by coating the surface of a synthetic mica with a metal oxide mainly composed of a titanium oxide and/or an iron oxide with an average thickness of from 0.1 to 5 μm and with an average particle diameter of from 2 to 300 μm are effective. The pigment exhibits gold, silver or a metallic color depending on the coverage of the metal oxide. In this connection, the average particle diameter indicates an average particle diameter measured by laser diffraction analysis and is a particle diameter corresponding to 50% of the cumulative distribution of the median diameter on a volume basis.

Specific examples of the metallic luster pigment obtained by coating the surface of a synthetic mica with a metal oxide include "Ultimica" (trade name) manufactured by Nihon Koken Koqyo Co., catalogue number: SB-100 (5 to 30 μm: silver), SD-100 (10 to 60 μm: silver), SE-100 (15 to 100 μm: silver), SF-100 (44 to 150 μm: silver), SH-100 (150 to 600 μm: silver), YB-100 (5 to 30 μm: gold), YD-100 (10 to 60 μm: gold), YE-100 (15 to 100 μm: gold), YF-100 (44 to 150 μm: gold), RB-100 (5 to 30 μm: red), RD-100 (10 to 60 μm; red), RE-100 (15 to 100 μm: red), RF-100 (44 to 150 μm: red), RBB-100 (5 to 30 μm: red-violet), RBD-100 (10 to 60 μm: red-violet), RBE-100 (15 to 100 μm; red-violet), RBS-100 (44 to 150 μm: red-violet), VB-100 (5 to 30 μm: violet), VD-100 (10 to 60 μm: violet), VE-100 (15 to 100 μm: violet), VF-100 (44 to 150 μm: violet), BB-100 (5 to 30 μm: blue), BD-100 (10 to 60 μm: blue), BE-100 (15 to 100 μm: blue), BF-100 (44 to 150 μm: blue), GB-100 (5 to 30 μm: green), GD-100 (10 to 60 μm: green), GE-100 (15 to 100 μm: green), GF-100 (44 to 150 μm: green) and the like.

As the metallic luster pigment containing a glass piece as a core material, those obtained by coating the surface of a flat glass piece with a metal mainly composed of a titanium oxide, gold, silver nickel and an iron oxide with an average thickness of from 0.1 to 5 μm and with an average particle diameter of from 2 to 300 μm are effective. In this connection, the average particle diameter indicates an average particle diameter measured by laser diffraction analysis and is a particle diameter corresponding to 50% of the cumulative distribution of the median diameter on a volume basis.

Specific examples of the metallic luster pigment obtained by coating the surface of a glass piece with a metal include "Metashine" (trade name) manufactured by Nippon Sheet Glass Co., catalogue number: MC5480PS (480 μm: silver), MC5230PS (230 μm: silver), MC5150PS (150 μm: silver), MC5090PS (90 μm: silver), MC5030PS (30 μm: silver), MC2080PS. (80 μm: silver), ME2040PS (40 μm: silver), ME2015PS (15 μm: silver), ME2025PSS1 (25 μm: silver), MC5090PSS1 (90 μm: silver) MC5090PSS2 (90 μm: silver), MC2015PSW1 (15 μm: silver) MC2025PSD1 (25 μm: silver), MC5480NS (480 μm: silver), MC5140NS (140 μm: silver), MC5090NS (90 μm: silver), MC5030NS (30 μm: silver), MC5480NB (480 μm: silver), MC5090NB (90 μm: silver), MC5030NB (480 μm: silver), MC1080NB (80 μm: silver), MC1020NB (20 μm: silver), MC5090RS (90 μm: silver), MC5090RY (90 μm: gold), MC5090RR (90 μm: red), MC5090RV (90 μm: violet), MC5090RB (90 μm: blue), MC5090RG (90 μm: green), MC1080RS (80 μm; silver), MC1080RY (80 μm: gold), MC1080RR (80 μm: red), MC1080RB (80 μm; blue), MC1080RG (80 μm: green), MC1040RS (40 μm: silver), MC1040RY (40 μm: gold), MC1040RR (40 μm: red), MC1040RB (40 μm: blue), MC1040RG (40 μm: green), MC1020RS (20 μm: silver), MC1020RY (20 μm: gold)-MC1020RR (20 μm: red), MC1020RB (20 μm: blue), MC1020RG (20 μm: green), MC1080RSS1 (80 μm: silver), MC1080RYS1 (80 μm: gold) and the like.

As a metallic luster pigment containing alumina as a core material, those obtained by coating the surface of a thin aluminum oxide with a metal oxide mainly composed of a titanium oxide and/or an iron oxide with an average thickness of from 0.1 to 5 μm and with an average particle diameter of from 2 to 100 μm are effective. The pigment exhibits gold, silver or a metallic color depending on the coverage of the metal oxide. In this connection, the average particle diameter indicates an average particle diameter measured by laser diffraction analysis and is a particle diameter corresponding to 50% of the cumulative distribution of the median diameter on a volume basis.

Specific examples of the metallic luster pigment obtained by coating the surface of alumina with a metal oxide include "Xirallic" (trade name) manufactured by Merck Co., catalogue number: T60-10WNT (10 to 30 μm: silver), T60-

20WNT (10 to 30 µm: gold), T60-21WNT (10 to 30 µm: red), F60-50WNT (10 to 30 µm: copper), F60-51WNT (10 to 30 µm: red), T50-10 (10 to 30 µm: silver) and the like.

As a multilayer metallic luster pigment containing aluminum as a core material, those obtained by coating the surface of thin aluminum with a silicon oxide and further coating it with a metal oxide mainly composed of an iron oxide with an average thickness of from 0.1 to 5 µm and with an average particle diameter of from 2 to 100 µm are effective. In this connection, the average particle diameter indicates an average particle diameter measured by laser diffraction analysis and is a particle diameter corresponding to 50% of the cumulative distribution of the median diameter on a volume basis.

Specific examples of such a metallic luster pigment include "VARIOCROM" (trade name) manufactured by BASF Co., catalogue number: MAGIC RED L4420 (10 to 30 µm; red).

In addition, those obtained by coating the surface of thin aluminum with a metal oxide mainly composed of an iron oxide with an average thickness of from 0.1 to 5 µm and with an average particle diameter of from 2 to 100 µm are also effective.

Specific examples of such a metallic luster pigment include "PALIOCROM" (trade name) manufactured by BASF Co., catalogue number: GOLD L2000 (10 to 30 µm: gold), GOLD L2020 (10 to 30 µm: gold), GOLD L2025 (10 to 30 µm: gold) and the like.

As a multilayer metallic luster pigment containing an iron oxide as a core material, those obtained by coating the surface of a thin iron oxide with a silicon oxide and further coating it with a metal oxide mainly composed of an iron oxide with an average thickness of from 0.1 to 5 µm and with an average particle-diameter of from 2 to 100 µm are effective. In this connection, the average particle diameter indicates an average particle diameter measured by laser diffraction analysis and is a particle diameter corresponding to 50% of the cumulative distribution of the median diameter on a volume basis.

Specific examples of such a metallic luster pigment include "VARIOCROM" (trade name) manufactured by BASF Co., catalogue number: MAGIC PURPLE L5520 (10 to 30 µm: purple).

In addition, as a metallic luster pigment containing an iron oxide as a core material, those obtained by coating the surface of a thin iron oxide with a metal mainly composed of aluminum and manganease with an average thickness of from 0.1 to 5 µm and with an average particle diameter of from 2 to 100 µm are effective. Specific examples of such a metallic luster pigment include "PALIOCROM" (trade name) manufactured by BASF Co., catalogue number: COPPER L3000 (10 to 30 µm: gold-red), COPPER L3101 (10 to 30 µm: gold-red) and the like.

The cholesteric liquid crystal metallic luster pigment has a characteristic of reflecting only a certain range of the incident light having a broad spectral range by the light interference effect of a liquid crystal polymer to be used and transmitting all the light other than this range. The reflectance spectral range depends on the pitch width of a helical polymer and the refractive index of a material, and the reflectance spectral range is split into left and right circularly polarized light components. At this time, according to the rotation direction of helix, it becomes possible that one component is reflected and the other component is transmitted. In this way, it has a characteristic of transmission and reflection over the whole spectral range, in other words, an excellent metallic luster property and a color flop effect in which color changes depending on the view angle.

Specific examples of the cholesteric liquid crystal metallic luster pigment include "Helicone HC" (trade name) manufactured by Wacker-Chemie Co., catalogue number: Sapphire (SLM90020) (blue to dark color), Scarabeus (SLM90120) (green to blue), Jade (SLM90220) (gold to green-blue), Maple (SLM90320) (red-copper to green) and the like.

In order to form a handwriting with a concentration of high visible sense by effectively expressing the coloring property of the aforementioned diarylethene photochromic compound as a photochromic agent, it is preferred that the vehicle has a light reflectance of a dry coating film in the wavelength range from 350 nm to 400 nm according to the following measurement method of 20% or more. In addition, in a system in which an emulsion binder is employed and the binder itself is in an undissolved state in the solvent, the reflectance is preferably 30% or more, and in a system in which the binder is in a dissolved state in the vehicle, the reflectance is preferably 40% or more.

As for the measurement method, a sample vehicle is coated on a white synthetic paper (a polyolefin synthetic paper in which a white pigment is blended) at a thickness of about 50 nm using a bar coater, dried at normal temperature to form a dry film and used as a specimen for measurement, and the aforementioned white synthetic paper is used as a reference specimen, and the reflectance in the wavelength range from 350 nm to 400 nm is obtained using a spectrophotometer (self-recording spectrophotometer U-3210, manufactured by Hitachi).

When the light reflectance of the vehicle is less than 20%, the effective expression of the ultraviolet ray irradiation effect on the photochromic agent is inhibited, and the effect on visualization by effectively expressing the original coloring concentration of the photochromic agent is poor.

Therefore, as for the binder resin or various additives constituting the vehicle, those which do not have an ultraviolet ray absorbency or even if they have an ultraviolet ray absorbency, those which do not inhibit the aforementioned irradiation effect are employed.

Incidentally, a photostabilizer such as an ultraviolet ray absorbent can also be added to the vehicle if it does not inhibit the aforementioned irradiation effect.

As the binder resin constituting the vehicle that satisfies the aforementioned requirements, a variety of synthetic resin emulsions such as aqueous dispersions of polyacrylic acid esters, styrene-acrylate copolymers, polyvinyl acetate, ethylene-vinyl acetate copolymers, ethylene methacrylic acid copolymers, α-olefin-maleic acid copolymers, silicone resins, polyester and polyurethane, water-soluble resins such as polyvinyl alcohols, polyvinyl pyrrolidone and polyvinyl butyral, alkali-soluble resins such as styrene-maleic acid copolymers, ethylene-maleic acid copolymers and styrene-acrylate copolymers, oil-soluble resins such as ketone resins, ketone-formaldehyde resins, amide resins, alkyd resins, rosin-modified resins, rosin-modified phenol resins, phenol resins, xylene resins, polyvinyl pyrrolidone, α- and β-pinene-phenol polycondensation resins, polyvinyl butyral resins and acrylic resins can be exemplified.

Further, shear-thinning imparting agents, for example, nonionic surfactants having a specific HLB value, xanthan gum, welan gum, succinoglycan (organic acid-modified heteroglycan composed of glucose unit and galactose unit, having an average molecular weight of about 100 to 8,000,000), guar gum, locust bean gum, hydroxyethyl cellulose, alkyl alginates, polymers mainly composed of alkyl methacrylate and having a molecular weight of 100,000 to 150,000, glycomannan, hydrocarbons having a gelling ability and extracted from seaweed such as agar or carrageenan, benzylidenesorbitol or derivatives thereof, crosslinking acrylic acid polymers and the like, are used alone or mixed in combination, and a shear-thinning ink with a viscosity of from 40 to 160 mPa·s (the value measured at a rotation rate of 100 rpm and at 25° C. using an EMD rotating viscometer) is prepared, whereby due to the shearing force on the writing tip during writing, for example in the form of a ballpoint pen, a high shearing force caused by high-speed rotation of the ball during writing, the viscosity of the ink in the vicinity of the ball is lowered, and the ink is allowed to flow out smoothly.

Further, by employing a polymer flocculating agent such as polyvinylpyrrolidone, polyethylene oxide, a water-soluble polysaccharide or a nonionic water-soluble cellulose derivative, a cohesive ink with a viscosity of from 3 to 20 mPa·s (25° C.) can be prepared. For example, in the form of a marking pen, by a mild crosslinking effect of the aforementioned water-soluble polymer flocculating agent, an ink in which pigments in the form of mildly cohesive microcapsules or resin particles are in a suspended state is allowed to flow out from the writing tip while stably maintaining the suspended state in a member having capillary spaces for a long time without being destroyed.

Examples of the water-soluble polysaccharides include tragacanth gum, guar gum, pullulan, cyclodextrin and the like. Examples of the nonionic water-soluble cellulose derivative include methyl cellulose, hydroxy cellulose, hydroxyethyl cellulose, hydroxypropyl cellulose, hydroxyethyl methyl cellulose, hydroxypropyl methyl cellulose and the like.

In addition, a variety of additives such as a lubricant, a pH adjustor, an antiseptic or a fungicide, a wetting agent, a defoamer and a dispersant can be used as needed.

As the solvent, in the case of a water-based ink, water and, if necessary, a water-soluble organic solvent are used. Examples of the water-soluble organic solvent include ethanol, propanol, butanol, glycerin, sorbitol, triethanolamine, diethanolamine, monoethanolamine, ethylene glycol, diethylene glycol, thiodiethylene glycol, polyethylene glycol, propylene glycol, butylene glycol, ethylene glycol monomethyl ether, ethylene glycol monoethyl ether, ethylene glycol monobutyl ether, diethylene glycol monomethyl ether, diethylene glycol monoethyl ether, diethylene glycol monobutyl ethers propylene glycol monobutyl ether, ethylene glycol monomethyl ether acetate, sulfolane, 2-pyrrolidone, N-methyl-2-pyrrolidone and the like.

Incidentally, the ink composition of the invention may be an oil-based ink using an organic solvent as a main solvent.

The aforementioned ink composition is filled into a marking pen, a ballpoint pen, a writing brush pen or the like equipped with a writing tip portion and is subjected to practical use.

In the case of filling the ink composition into a marking pen, the structure and the form of the marking pen itself are not particularly limited, and for example, a marking pen, which is equipped with a marking pen tip such as a fiber tip, a felt tip or a plastic tip and has a structure in which an ink absorber made of a fiber bundle accommodated in the inside of a tubular member is impregnated with the ink and the ink is fed to the tip, a structure in which the ink is directly accommodated in the inside of the tubular member and a comb-shaped ink flow rate-adjusting member or an ink flow rate-adjusting member made of a fiber bundle is interposed, or a structure in which the ink is directly accommodated in the inside of the tubular member and a predetermined amount of ink is fed to the tip via a valve mechanism can be exemplified.

In the case of filling the ink composition into a ballpoint pen, the structure and the form of the ballpoint pen itself are not particularly limited, and for example, a ballpoint pen having a structure in which an ink absorber made of a fiber bundle accommodated in the inside of a tubular member is impregnated with the ink and the ink is fed to the ballpoint pen tip, a structure in which the ink is directly accommodated in the inside of the tubular member and a comb-shaped ink flow rate-adjusting member or an ink flow rate-adjusting member made of a fiber bundle is interposed, or a structure in which an ink container filled with the ink composition is provided in the inside of the tubular member, the ink container is connected to the ballpoint pen tip equipped with a ball at the top end portion thereof and a liquid stopper for preventing backflow is brought into contact with the end face of the ink can be exemplified.

Further illustrating the aforementioned ballpoint pen tip, a tip comprising a ball hold by a ball holding portion formed by pressing and deforming inwardly from the outer surface of a metal pipe in the vicinity of the top end, a tip comprising a ball hold by a ball holding portion formed by cutting a metal material with a drill or the like, a tip provided with a ball receiving seat made of a resin in the inside of a metal or plastic tip, a spring-loaded tip in which a ball hold in any of the aforementioned tips is biased forward by a spring or the like can be employed.

In addition, as for the ball, those made of a hard metal, a stainless steel, ruby, a ceramics, a resin, a rubber or the like with a size of from 0.1 to 3 mm, preferably from 0.3 to 1.5 mm, more preferably from 0.5 to 1.0 mm can be employed.

Incidentally, the writing instrument filled with the ink of the present invention includes those having at the writing tip portion, a rolling mechanism such as a roller for forming a handwriting by a rolling action similar to that of the ball.

As for the ink container that reserves the ink composition, a molded article made of, for example, a resin such as polyethylene, polypropylene, polyethylene terephthalate or nylon or a metal is employed.

The tip may be directly connected to the ink container, or may be connected to it via a connecting member.

Incidentally, a ballpoint pen may be constituted by accommodating a refill comprising a tip and an ink container in the tubular member or may be constituted by directly filling an ink into the tubular member equipped with a tip at the top end portion thereof.

An ink follower can also be injected at the rear end of the ink composition filled in the aforementioned ink container.

The aforementioned ink follower composition comprises a nonvolatile liquid or a hardly-volatile liquid.

Specific examples thereof include petrolatum, spindle oil, caster oil, olive oil, purified mineral oil, liquid paraffin, polybutene, $\alpha$-olefin, $\alpha$-olefin oligomer or co-oligomer, dimethyl silicone oil, methyl phenyl silicone oil, amino-modified silicone oil, polyether-modified silicone oil, fatty acid-modified silicone oil and the like, and they can be used alone or in combination with two or more types thereof.

It is preferred that the viscosity of the nonvolatile liquid or the hardly-volatile liquid is increased to a preferred level by adding a gelling agent thereto. Examples of the gelling agent include silica surface of which was subjected to a hydrophobic treatment, microparticle silica surface of which was subjected to a methylation treatment, aluminum silicate, swellable mica, clay thickeners such as bentonite or montmorillonite subjected to a hydrophobic treatment, fatty acid metal soaps such as magnesium stearate, calcium stearate, aluminum stearate and zinc stearate, tribenzylidene sorbitol, fatty acid amide, amide-modified polyethylene wax, hydrogenated caster oil, dextrin compounds such as dextrin fatty acid esters and cellulose compounds.

Further, the aforementioned liquid ink ink follower composition and solid ink follower can be used in combination.

Incidentally, the form of the writing instrument is not limited to those described above, it may be a twin type writing instrument equipped with pen bodies with different forms, or equipped with pen bodies for extruding inks in different colors.

The writing instrument constituted as described above is required to use a light-shielding tubular member or refill in order to stably maintain the coloring state of the photochromic compound accommodated therein for a long time.

This is because the diarylethene photochromic compound contained in the ink has a characteristic of developing color when ultraviolet rays are irradiated and decoloring when visible light is irradiated, therefore when using the writing instrument of the present invention, a handwriting is visible when writing, thereafter, by applying the color-changing means to the handwriting as needed, irradiation of the handwriting with visible light is effected to decolor or discolor the handwriting by decoloring the photochromic compound, and the handwriting is returned to the original color again by irradiating the handwriting with ultraviolet rays such as sunlight again.

In order to express such color change, it is necessary that the photochromic compound contained in the ink maintains a coloring state in the writing instrument.

As a result of investigation by the present inventors, when an ink in which the photochromic compound was in a coloring state was filled in a light-transmitting tubular member or refill and left in a room, a phenomenon in which the ink was decolored or discolored due to the irradiation with visible light in the room was observed.

This is because the light in the room contained a large amount of visible light, and the ink in a coloring state was irradiated with the light passing through the light-transmitting tubular member or refill thereby being decolored or discolored.

In order to solve the aforementioned problems and to allow the ink to express a desired color change, it is necessary that after the ink is irradiated with ultraviolet rays or sunlight to develop color, the ink is filled in a light-shielding tubular member or refill, or after the ink is filled in a light-transmitting refill, the refill is irradiated with ultraviolet rays or sunlight to develop color and is accommodated in a light-shielding tubular member so that the ink is not irradiated with light.

Incidentally, in the case where it is a writing instrument equipped with a cap (particularly a marking pen), the ink in the tip may be decolored or discolored by irradiating the tip with light, therefore, it is preferred that the cap also has a light-shielding property.

A color-changing means for decoloring or discoloring a handwriting formed with the aforementioned writing instrument contains an ultraviolet ray absorbent and/or a light-shielding pigment for shielding at least ultraviolet rays, and is a means for cutting off ultraviolet rays of sunlight, thereby changing the photochromic compound in a coloring state by the visible light irradiation to a decoloring state and maintaining the decoloring state. A conventionally used ultraviolet ray absorbent or light-shielding pigment can be employed, and a sheet formed by integrally blending it with a thermoplastic plastic or thermosetting plastic transparent substrate and other molded articles in an optional form can be exemplified.

Further, a sheet prepared by providing a printing or coating layer in which an ultraviolet ray absorbent and/or a light-shielding pigment for shielding ultraviolet rays are/is fixed in a binder resin in a dissolved or dispersed state on a surface of a transparent substrate, and other printing and coating materials in an optional form can be exemplified.

Incidentally, by providing an adhesive layer on the lower layer of the aforementioned sheet or by providing an adhesive layer containing an ultraviolet ray absorbent and/or a light-shielding pigment for shielding ultraviolet rays on the lower layer of a transparent sheet, the sheet can be attached to a surface for writing of a paper or the like on which a handwriting is formed, and the handwriting in a decoloring or discoloring state can be easily maintained.

In addition, the color-changing means may be in the form of fluid such as a paste, gel or the like, blended with an ultraviolet ray absorbent and/or a light-shielding pigment. Further, the color-changing means in the form of the aforementioned fluid may be accommodated in a writing instrument, a coating instrument or a stamping instrument and can be subjected to practical use.

Incidentally, as for the color-changing means in the form of fluid, a fluid having a release property that can be removed after writing, coating or stamping on a photochromic handwriting is preferably used.

A method for alternately memorizing and maintaining a coloring state and decoloring state of a writing image by arranging the color-changing means in a contacted or uncontacted state to a photochromic writing image formed on a surface for writing with the aforementioned color-memorizing photochromic writing instrument, whereby the writing image in a coloring state is changed to a decoloring state and maintained the changed state is extremely effective in the anticounterfeit area.

In the case where an ultraviolet ray absorbent is integrally blended with the transparent plastic, an effective ultraviolet ray cutting function is exerted by blending 0.001% by weight or more, preferably 0.01% by weight or more based on the weight of the plastic, of the ultraviolet ray absorbent.

In addition, in the case where a fluid obtained by dissolving or dispersing an ultraviolet ray absorbent in a fluid containing a binder resin is used, an effective ultraviolet ray cutting function is exerted by blending 0.05% by weight or more, preferably 0.1% by weight or more based on the binder resin, of the ultraviolet ray absorbent.

On the other hand, in the case where a light-shielding pigment is blended, a desired ultraviolet ray cutting effect is exerted by blending it at a ratio of from 0.1 to 40% by weight, preferably from 1 to 30% by weight based on the aforementioned plastic or binder resin.

Examples of the aforementioned ultraviolet ray absorbent include benzophenone ultraviolet ray absorbents such as 2,4-hydroxybenzophenone, 2-hydroxy-4-methoxybenzophenone, 2,2'-dihydroxy-4,4'-dimethoxy-benzophenone, 2,2',4,4'-tetrahydroxybenzophenone, 2-hydroxy-4-methoxybenzophenone-5-sulfonic acid, 2-hydroxy-4-octoxybenzophenone, bis-(2-methoxy-4-hydroxy-5-benzoylphenyl)-methane, 2-[2'-hydroxy-3',5'-di-t-amylphenyl]-benzophenone, 2-hydroxy-4-dodecyloxy-benzophenone (trade name: Seasorb 103, manufactured by Sipro Kasei Co.), 2-hydroxy-4-octadecyloxybenzophenone, 2,2'-dihydroxy-4-methoxybenzophenone, 2-hydroxy-4-benzyloxybenzophenone and 2-[2'-hydroxy-3',5'-di-t-amylphenyl]-benzophenone;

salicylic acid ultraviolet ray absorbents such as phenyl salicylate, para-t-butylphenyl salicylate, paraoctylphenyl salicylate, 2,4-di-t-butylphenyl-4-hydroxy benzoate, 1-hydroxy benzoate, 1-hydroxy-3-t-butyl-benzoate, 1-hydroxy-3-t-octyl benzoate and resorcinol monobenzoate;

cyanoacrylate ultraviolet ray absorbents such as ethyl-2-cyano-3,3'-diphenylacrylate, 2-ethylhexyl-2-cyano-3,3'-diphenylacrylate and 2-ethylhexyl-2-cyano-3-phenylcinnate;

benzotriazole ultraviolet ray absorbents such as 2-[5-t-butyl-2-hydroxyphenyl]-benzotriazole [trade name: Tinuvin PS, manufactured by Ciba-Geigy Co.], 2-[5-methyl-2-hydroxyphenyl)-benzotriazole, 2-[2-hydroxy-3,5-bis(α,α-dimethylbenzyl)phenyl]-2H-benzotriazole, 2-[3,5-di-t-butyl-2-hydroxyphenyl]-benzotriazole, 2 [3-t-butyl-5-methyl-2-hydroxyphenyl]-5-chlorobenzotriazole, 2-[(3,5-di-t-butyl-2-hydroxyphenyl]-5-chlorobenzo-triazole, 2-[3,5-di-t-amyl-2-hydroxyphenyl]-benzotriazole [trade name: Tinuvin 328, manufactured by Ciba-Geigy Co.], methyl-3-[3-t-butyl-5-(2H-benzotriazol-2-yl)-4-hydroxyphenyl]propionate-polyethylene glycol (molecular weight 300) [trade name; Tinuvin 1130, manufactured by Ciba-Geigy Co.], 2-[3-dodecyl-5-methyl-2-hydroxyphenyl)-benzotriazole methyl-3-[3-(2H-benzotriazol-2-yl)-5-t-butyl-4-hydroxyphenyl]-propionate-polyethylene glycol (molecular weight 300), 2-[3-t-butyl-5-propyloctylate-2-hydroxyphenyl]-5-chlorobenzotriazole, 2-[2-hydroxyphenyl-3,5-di-(1,1'-dimethylbenzyl)phenyl]-2H-benzotriazole, 2-[2-hydroxy-5-t-octylphenyl]-2H-benzotriazole, 2-(3-t-butyl-5-octyloxycarbonylethyl-2-hydroxyphenyl]-benzotriazole [trade name: Tinuvin 384, manufactured by Ciba-Geigy Co.], 2-[2-hydroxy-5-tetraoctylphenyl]-benzotriazole, 2-[2-hydroxy-4-octoxy-phenyl]-benzotriazole, 2-[2]-hydroxy-3'-(3",4", 5",6"-terahydrophthalimidomethyl)-5'-methylphenyl]-benzotriazole and 2-[2-hydroxy-5-t-butylphenyl]-benzotriazole; and oxalic acid anilide ultraviolet ray absorbents such as ethanediamido-N-(2-ethoxyphenyl)-N'-(4-isododecylphenyl), and 2,2,4,4-tetramethyl-20-(β-lauryl-oxycarbonyl)-ethyl-7-oxa-3,20-diazodispiro (5,1,11,2)heneicosan-21-one; and the like.

As the light-shielding pigment, a metallic luster pigment having a particle diameter of from 5 to 400 μm or a transparent titanium dioxide, transparent iron oxide, transparent cerium oxide, transparent zinc oxide and the like having a particle diameter of 1 μm or less can be exemplified, and one or two or more types thereof can be employed.

As the aforementioned metallic luster pigment, those obtained by coating the surface of a core material selected from natural mica, a synthetic mica, glass and alumina with a metal oxide can be exemplified, and metallic luster tone color change can be visualized by the synergistic action of the rainbow color effect and transmission effect generated by the selective interference-action of visible light with the visible light reflection effect of the photochromic layer.

In a system where the aforementioned light-shielding pigment is employed, since it has two-sidedness of both light absorption (or light reflection) function and light transmission function, absorbs or reflects at least a portion of ultraviolet rays and visible light, can transmit visible light in an appropriate quantity which does not hinder visible sense and can effect perspective observation of color changes in the photochromic layer.

In this connection, a layer containing the ultraviolet ray absorbent can be arranged in a laminated layer state on the upper layer or lower layer of a layer containing the aforementioned light-shielding pigment. Also, a coexisting layer can be formed by blending the light-shielding pigment and the ultraviolet ray absorbent at an appropriate ratio.

The aforementioned color-changing means is arranged on a photochromic writing image in a contacted or uncontacted state. Generally, the one in the form of sheet is applied in a state in which its entire face is contacted or a part thereof is contacted, however, it can be arranged in an uncontacted state at an appropriate interval.

A writing formed with the aforementioned color-memorizing photochromic writing instrument can be decolored or discolored by the aforementioned color-changing means. Thereafter, however, the handwriting can be returned to the original by removing the color-changing means from the handwriting and developing color by irradiation with ultraviolet rays using an ultraviolet irradiator or irradiation with sunlight containing ultraviolet rays, and it can be visualized by memorizing and maintaining the state.

EXAMPLES

Hereinafter, Examples of ink compositions for a color-memorizing photochromic writing instrument will be shown, however, the present invention is not limited to these, can have an ink property applicable to a writing instrument form according to the purpose, and can be subjected to practical use.

Incidentally, all parts in the Examples are parts by weight.

In addition, the shear-thinning index (n) in the Examples is expressed as a value n calculated by fitting a shear stress value (T) and a shear rate value (J) obtained from Theological measurements on a viscometer to an experimental equation ($T = KJ^n$, in which K is calculated constants).

Example 1

Preparation of Ink for Color-Memorizing Photochromic Writing Instrument

A shear-thinning color-memorizing photochromic ink comprising 44.0 parts of microcapsule slurry (solid content: 27.3%) of a microcapsule pigment (average particle diameter: 2.5 μm) in which a diarylethene photochromic compound A (1,2-bis(2,4-dimethyl-5-phenyl-3-thienyl)-3,3,4,4,5,5-hexafluorocyclopentene which reversibly changes color from colorless to blue was encapsulated with an epoxy resin film by a known interfacial polymerization method, 0.33 part of xanthan gum (a shear-thinning material), 32.8 parts of water, 11.0 parts of urea, 11.0 parts of glycerin, 0.55 part of a nonionic permeability imparting agent (trade name: Nopco SW-WET-366, manufactured by San Nopco Co.), 0.13 part of a modified silicone defoamer (trade name: Nopco 8034, manufactured by San Nopco Co.) and 0.13 part of a fungicide (trade name: Proxel XL-2, manufactured by Zeneca Co.) was prepared.

As a result of measuring the viscosity of the ink at 25° C. with an EMD viscometer, it was 1020 mPa·s at a measuring rotation rate of 1 rpm, and 84 mPa·s at a measuring rotation rate of 100 rpm, and the shear-thinning index n was 0.48. In addition, the light reflectance of the vehicle film obtained by removing the microcapsule slurry from the ink was 97% at 400 nm and 90% at 350 nm.

Preparation of Color-Memorizing Photochromic Writing Instrument (see FIG. 1)

The ink 2, which was allowed to develop blue in advance by ultraviolet ray irradiation, was filled by suction at 0.8 g in an ink container 3 (polypropylene pipe with an inner diameter of 3.3 mm), which was connected to a ballpoint pen tip 5 via a connecting member 4 made of a resin.

Incidentally, as the ballpoint pen tip 5, a cutting-type ballpoint pen tip in which a stainless steel ball with a size of 0.8 mm was accommodated (a moving distance in a radial direction of the ball is about 20 μm and a movable distance in an axial direction is about 70 μm) was used.

Subsequently, an ink follower 6 (liquid stopper) having viscoelasticity based on polybutene was injected from the end portion of the ink container 3, a light-shielding tubular member 7, a mouth ring 8 and a light-shielding cap 9 were installed, and then a degassing treatment was carried out by centrifugation, whereby a color-memorizing photochromic writing instrument 1 (ballpoint pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the ballpoint pen and the sheet.

When writing was carried out on a writing paper with the ballpoint pen, a blue handwriting could be formed. The handwriting was not decolored even in a dark place, that is, it was not decolored in normal using conditions.

Subsequently, the sheet was placed on the paper on which the blue handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the sheet was removed and sunlight was irradiated. As a result, the handwriting was changed from colorless to blue by ultraviolet rays contained in sunlight. This state was maintained without discoloring when it was left outdoors, in a room or in a dark place.

Example 2

Preparation of Ink for Color-Memorizing Photochromic Writing Instrument 44.0 parts of slurry (solid content: 30%) of a color-memorizing photochromic pigment obtained by dissolving a diarylethene photochromic compound B (1,2-bis(5-methyl-2-phenyl-4-thiazoyl)-3,3,4,4,5,5-hexafluorocyclopentene) which reversibly changes color from colorless to pink in a styrene resin and xylene and allowing it to have an average particle diameter of 2 µm in water with an agitator and then removing xylene from the emulsion by heating was homogenously dispersed in an aqueous solvent comprising 5.0 parts of glycerin, 0.7 part of a fungicide (trade name; Proxel XL-2, manufactured by Zeneca Co.), 0.1 part of a silicone defoamer (trade name: SN defoamer 381, manufactured by San Nopco Co.) and 42.2 parts of water, and 8.0 parts of an aqueous solution containing 5.0% by weight of hydroxyethyl cellulose (trade name: Cellulosize WP-09L, manufactured by Union Carbide Japan KK., water-soluble polymer flocculating agent) was added to the solution in a dispersed state while stirring, whereby a cohesive ink for a color-memorizing photochromic writing instrument in which the color-memorizing photochromic pigment was dispersed in a mild cohesive state was prepared.

As a result of measuring the viscosity of the ink at 25° C. with a B-type viscometer by applying a BL adapter, it was 4.4 mPa·s at a measuring rotation rate of 60 rpm. In addition, the light reflectance of the vehicle film obtained by removing the color-memorizing photochromic pigment from the cohesive ink for a color-memorizing photochromic writing instrument was 95% at 400 nm and 85% at 350 nm.

Figure 2:
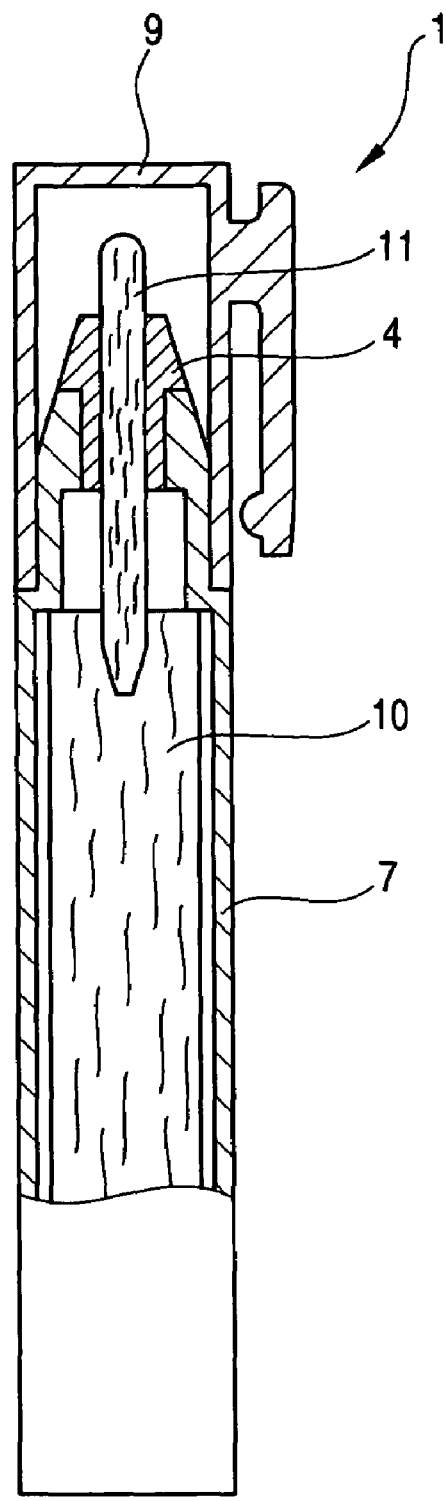
FIG. 2 is an explanatory longitudinal sectional view showing a color-memorizing photochromic writing instrument in the form of a marking pen having a fiber pen body of the present invention.

Preparation of Color-Memorizing Photochromic Writing Instrument (see FIG. 2)

A fiber bundle ink absorber 10 (porosity: about 80%) obtained by coating polyester sliver with a synthetic resin film was impregnated with the ink, which was allowed to develop blue in advance by ultraviolet ray irradiation, right after the ink was stirred into a homogenous mixture, and accommodated in a light-shielding tubular member 7. A marking pen tip 11 made of a polyester fiber (porosity: about 50%) was fitted and attached to the top end portion of the tubular member via a connecting member 4, and a light-shielding cap 9 was further attached thereto, whereby a color-memorizing photochromic writing instrument 1 (marking pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the marking pen and the sheet.

When writing was carried out on a writing paper with the marking pen, a pink handwriting could be formed. The handwriting was not decolored even in a dark place, that is, it was not decolored in normal using conditions.

Subsequently, the sheet was placed on the paper on which the pink handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the sheet was removed and sunlight was irradiated. As a result, the handwriting was changed from colorless to pink by ultraviolet rays contained in sunlight. This state was maintained without discoloring when it was left outdoors, in a room or in a dark place.

Example 3

Preparation of Ink for Color-Memorizing Photochromic Writing Instrument

A shear-thinning ink for a color-memorizing photochromic writing instrument comprising 44.0 parts of microcapsule slurry (solid content: 30%) of a microcapsule pigment (average particle diameter: 2.5 µm) in which a diarylethene photochromic compound C (1,2-bis(3-methyl-2-thienyl)-3, 3,4,4,5,5-hexafluorocyclopentene) which reversibly changes color from colorless to yellow was encapsulated with an epoxy resin film by a known interfacial polymerization method, 1 part of a silver metallic luster pigment (trade name: Iriodin 111, manufactured by Merck Co.), 0.33 part of xanthan gum (a shear-thinning material), 31.86 parts of water, 11.0 parts of urea, 11.0 parts of glycerin, 0.55 part of a nonionic permeability imparting agent (trade name: Nopco SW-WET-366, manufactured by San Nopco Co.), 0.13 part of a modified silicone defoamer (trade name: Nopco 8034, manufactured by San Nopco Co.) and 0.13 part of a fungicide (trade name: Proxel XL-2, manufactured by Zeneca Co.) was prepared.

As a result of measuring the viscosity of the ink at 25° C. with an EMD viscometer, it was 1020 mPa·s at a measuring rotation rate of 1 rpm, and 84 mPa·s at a measuring rotation rate of 100 rpm, and the shear-thinning index n was 0.48. In addition, the light reflectance of the vehicle film obtained by removing the microcapsule slurry from the ink was 55% at 400 nm and 40% at 350 nm.

Preparation of Color-Memorizing Photochromic Writing Instrument

The ink, which was allowed to develop gold in advance by ultraviolet ray irradiation, was filled in a ballpoint pen refill in which a stainless steel ballpoint pen tip holding a ball with a diameter of 0.7 mm was fitted and attached to one end of an ink container made of polypropylene, and an ink follower was injected at the rear end of the ink. Then, the ballpoint pen refill was installed in a light-shielding tubular member, whereby a color-memorizing photochromic writing instrument (ballpoint pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the ballpoint pen and the sheet.

When writing was carried out on a writing paper with the ballpoint pen, a gold handwriting could be formed. The handwriting was not decolored even in a dark place, that is, it was not decolored in normal using conditions.

Subsequently, the sheet was placed on the paper on which the gold handwriting was formed and sunlight was irradiated. Ultraviolet rays contained in sunlight were shielded by the sheet, and light other than these (visible light) was irradiated, therefore, the writing image was gradually discolored to light silver. This state was maintained without discoloring when it was left in a room or in a dark place.

Thereafter, the sheet was removed, an ultraviolet ray lamp and a light source were installed in the inside of the plastic main body, and ultraviolet rays were irradiated from an ultraviolet irradiator capable of irradiating the handwriting with ultraviolet rays from the top end portion by pressing the switch. As a result, the handwriting was changed from light silver to gold. This state was maintained without discoloring when it was left outdoors, in a room or in a dark place.

Example 4

Preparation of Ink for Color-Memorizing Photochromic Writing Instrument 13.0 parts of a color-memorizing photochromic pigment with an average particle diameter of 2 μm obtained by dissolving a diarylethene photochromic compound A (1,2-bis(2,4-dimethyl-5-phenyl-3-thienyl)-3,3,4,4,5,5-hexafluorocyclopentene) which reversibly changes color from colorless to blue in a styrene resin and subjecting it to a bulk resin grinding method was homogenously dispersed in an aqueous solvent comprising 0.5 part of a red dye (Erythrosine, C.I. 4530, manufactured by Aizen-Hodogaya Co.), 5.0 parts of glycerin, 0.7 part of a fungicide (trade name: Proxel XL-2, manufactured by Zeneca Co.), 0.1 part of a silicone defoamer (trade name: SN defoamer 381, manufactured by San Nopco Co.) and 41.7 parts of water, and 8.0 parts of an aqueous solution containing 5.0% by weight of hydroxyethyl cellulose (trade name: Cellulosize WP-09L, manufactured by Union Carbide Japan KK., water-soluble polymer flocculating agent) was added to the solution in a dispersed state while stirring, whereby a cohesive ink for a color-memorizing photochromic writing instrument in which the color-memorizing photochromic pigment was dispersed in a mild cohesive state was prepared.

As a result of measuring the viscosity of the ink at 25° C. with a B-type viscometer by applying a BL adapter, it was 4.4 mPa·s at a measuring rotation rate of 60 rpm. In addition, the light reflectance of the vehicle film obtained by removing the color-memorizing photochromic pigment from the ink was 45% at 400 nm and 35% at 350 nm.

Preparation of Color-Memorizing Photochromic Writing Instrument

A fiber bundle ink absorber (porosity: about 80%) obtained by coating polyester sliver with a synthetic resin film was impregnated with the ink, which was allowed to develop violet in advance by ultraviolet ray irradiation, right after the ink was stirred into a homogenous mixture, accommodated in a light-shielding tubular member, and installed in a contacted state with a marking pen tip made of a polyester fiber (porosity: about 50%) which was attached to the top end portion of the tubular member, whereby a color-memorizing photochromic writing instrument (marking pen) was obtained.

Preparation of Color-Changing Means

A sheet (color-changing means) was prepared by cutting a polyester resin film containing a metallic luster pigment called pearl pigment (trade name: Iriodin 219, manufactured by Merck Japan Ltd.), which was obtained by coating the surface of natural mica with a titanium oxide.

A color-memorizing photochromic writing instrument set was obtained by combining the marking pen and the sheet.

When writing was carried out on a writing paper with the marking pen, a violet handwriting could be formed. The handwriting was not discolored even in a dark place, that is, it was not discolored in normal sing conditions.

Subsequently, the sheet was placed on the paper on which the violet handwriting was formed and sunlight was irradiated. Ultraviolet rays contained in sunlight were shielded by the sheet, and light other than these (visible light) was irradiated, therefore, the writing image was gradually discolored to pink. This state was maintained without discoloring when it was left in a room or in a dark place.

Thereafter, the sheet was removed and sunlight was irradiated. As a result, the handwriting was changed from pink to violet by ultraviolet rays contained in sunlight. This state was maintained without discoloring when it was left outdoors, in a room or in a dark place.

Example 5

Preparation of Ink for Color-Memorizing Photochromic Writing Instrument

An ink for a color-memorizing photochromic writing instrument was prepared by stirring and mixing 3 parts of a diarylethene photochromic compound D (1-(2-phenyl-5-methyl-4-thiazoyl)-2-(3-methyl-2-thienyl)-3,3,4,4,5,5-hexafluorocyclopentene) which reversibly changes color from colorless to orange, 7 parts of a ketone-formaldehyde resin (trade name: Synthetic Resin SK, manufactured by Huels Co.), 78 parts of propylene glycol monomethyl ether and 10 parts of methyl lactate.

The light reflectance of the vehicle film obtained by removing the diarylethene photochromic compound D from the ink for the color-memorizing photochromic writing instrument was 90% at 400 nm and 80% at 350 nm.

Preparation of Color-Memorizing Photochromic Writing Instrument

A fiber bundle ink absorber (porosity: about 80%) obtained by coating polyester sliver with a synthetic resin film was impregnated with the ink, which was allowed to develop orange in advance by ultraviolet ray irradiation, right after the ink was stirred into a homogenous mixture, accommodated in a light-shielding tubular member, and installed in a contacted state with a marking pen tip made of a polyester fiber (porosity: about 50%) which was attached to the top end portion of the tubular member, whereby a color-memorizing photochromic writing instrument (marking pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the marking pen and the sheet.

When writing was carried out on a writing paper with the marking pen, an orange handwriting could be formed. The handwriting was not decolored even in a dark place, that is, it was not decolored in normal using conditions.

Subsequently, the sheet was placed on the paper on which the orange handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the sheet was removed and sunlight was irradiated. As a result, the handwriting was changed from colorless to orange by ultraviolet rays contained in sunlight. This state was maintained without discoloring when it was left outdoors, in a room or in a dark place.

Example 6

Preparation of Ink for Color-Memorizing Photochromic Writing Instrument

An ink for color-memorizing photochromic writing instrument was prepared by stirring and mixing 4 parts of a diarylethene photochromic compound B (1,2-bis(5-methyl-2-phenyl-4-thiazoyl)-3,3,4,4,5,5-hexafluorocyclopentene) which reversibly changes color from colorless to pink, 0.1 part of a blue dye (Victoria Pure Blue BOH, C.I. basic blue 7, manufactured by Hodogaya Chemical Co.), 7 parts of a ketone-formaldehyde resin (trade name; Synthetic Resin SK, manufactured by Huels Co.), 78 parts of propylene glycol monomethyl ether and 10 parts of methyl lactate.

The light reflectance of the vehicle film obtained by removing the diarylethene photochromic compound B from the ink for the color-memorizing photochromic writing instrument was 60% at 400 nm and 50% at 350 nm.

Preparation of Color-Memorizing Photochromic Writing Instrument

A fiber bundle ink absorber (porosity: about 80%) obtained by coating polyester sliver with a synthetic resin film was impregnated with the ink, which was allowed to develop violet in advance by ultraviolet ray irradiation, right after the ink was stirred into a homogenous mixture, accommodated in a light-shielding tubular member, and installed in a contacted state with a marking pen tip made of a polyester fiber (porosity: about 50%) which was attached to the top end portion of the tubular member, whereby a color-memorizing photochromic writing instrument (marking pen) was obtained.

Preparation of Color-Changing Means

An open-close type sheet (color-changing means) capable of sandwiching a paper was prepared by fixing with a hinge, one side of one set of sheets obtained by cutting a transparent and colorless acrylic resin film having an ultraviolet ray-absorbing ability.

A color-memorizing photochromic writing instrument set was obtained by combining the marking pen and the sheet.

When writing was carried out on a writing paper with the marking pen, a violet handwriting could be formed. The handwriting was not decolored even in a dark place, that is, it was not decolored in normal using conditions.

Subsequently, the paper on which the violet handwriting was formed was sandwiched in the color-changing means and sunlight was irradiated. Ultraviolet rays contained in sunlight were shielded by the sheet, and light other than these (visible light) was irradiated, therefore, the writing image was gradually changed from violet to blue. This state was maintained without discoloring when it was left in a room or in a dark place.

Thereafter, the color-changing means was removed and sunlight was irradiated. As a result, the handwriting was changed from blue to violet by ultraviolet rays contained in sunlight. This state was maintained without discoloring when it was left outdoors, in a room or in a dark place.

Example 7

Preparation of Ink for Color-Memorizing Photochromic Writing Instrument

An ink for color-memorizing photochromic writing instrument was prepared by stirring and mixing 3 parts of a diarylethene photochromic compound E (1,2-bis(2-methyl-6-nitro-3-benzothienyl)-3,3,4,4,5,5-hexafluorocyclo-pentene) which reversibly changes color from colorless to green, 7 parts of a ketone-formaldehyde resin (trade name: Synthetic Resin SK, manufactured by Huels Co.), 10 parts of an acrylic copolymer emulsion (trade name: Primal ASE-60, Manufactured by Rohm & Haas Co.), 2 parts of polyoxyethylene alkyl ether phosphate (trade name: Plysurf A207H, manufactured by Daiichi Kogyo Seiyaku Co.), 5 parts of benzyl alcohol and 71 parts of ethyl alcohol.

The light reflectance of the vehicle film obtained by removing the diarylethene photochromic compound E from the ink was 96% at 400 nm and 80% at 350 nm.

Preparation of Color-Memorizing Photochromic Writing Instrument

The ink, which was allowed to develop green in advance by ultraviolet ray irradiation, was filled in a ballpoint pen refill in which a stainless steel ballpoint pen tip holding a ball with a diameter of 0.7 mm was fitted and attached to one end of a light-shielding ink container made of polypropylene, and an ink follower was injected at the rear end of the ink. Then, the ballpoint pen refill was installed in a tubular member, whereby a color-memorizing photochromic writing instrument (ballpoint pen) was obtained.

Preparation of Color-Changing Means

A sheet (color-changing means) was prepared by cutting a polyvinyl chloride resin film containing an ultraviolet ray absorbent and hologram glitter (trade name: Daiya Hologram HG-20, manufactured by Daiya Kogyo Co).

Incidentally, the hologram glitter was added for improving fanciness and the added value of an article.

A color-memorizing photochromic writing instrument set was obtained by combining the ballpoint pen and the sheet.

When writing was carried out on a writing paper with the ballpoint pen, a green handwriting could be formed. The handwriting was not decolored even in a dark place, that is, it was not decolored in normal using conditions.

Subsequently, the sheet was placed on the paper on which the green handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the sheet was removed and sunlight was irradiated. As a result, the handwriting was changed from colorless to green by ultraviolet rays contained in sunlight. This state was maintained without discoloring when it was left outdoors, in a room or in a dark place.

Example 8

Preparation of Ink for Color-Memorizing Photochromic Writing Instrument

An ink for color-memorizing photochromic writing instrument was prepared by stirring and mixing 3 parts of a diarylethene photochromic compound B (1,2-bis (5-methyl-2-phenyl-4-thiazoyl)-3,3,4,4,5,5-hexafluorocyclopentene) which reversibly changes color from colorless to pink, 0.1 part of a blue dye (Victoria Pure Blue BOH, C.I. basic blue 7, manufactured by Hodogaya Chemical Co.), 7 parts of a ketone-formaldehyde resin (trade name: Synthetic Resin SK, manufactured by Huels Co.), 10 parts of an acrylic copolymer emulsion (trade name: Primal ASE-60, Manufactured by Rohm & Haas Co.), 2 parts of polyoxyethylene alkyl ether phosphate (trade name: Plysurf A207H, manufactured by Daiichi Kogyo Seiyaku Co.), 5 parts of benzyl alcohol and 71 parts of ethyl alcohol.

The light reflectance of the vehicle file obtained by removing the diarylethene photochromic compound B from the ink was 60% at 400 nm and 50% at 350 nm.

Preparation of Color-Memorizing Photochromic Writing Instrument

The ink, which was allowed to develop violet in advance by ultraviolet ray irradiation, was filled in a ballpoint pen refill in which a stainless steel ballpoint pen tip holding a ball with a diameter of 0.7 mm was fitted and attached to one end of an ink container made of polypropylene, and an ink follower was injected at the rear end of the ink. Then, the ballpoint pen refill was installed in a light-shielding tubular member, whereby a color-memorizing photochromic writing instrument (ballpoint pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the ballpoint pen and the sheet.

When writing was carried out on a writing paper with the ballpoint pen, a violet handwriting could be formed. The handwriting was not discolored even in a dark place, that is, it was not discolored in normal using conditions.

Subsequently, the sheet was placed on the paper on which the violet handwriting was formed and sunlight was irradiated. Ultraviolet rays contained in sunlight were shielded by the sheet, and light other than these (visible light) was irradiated, therefore, the writing image was gradually discolored to blue. This state was maintained without discoloring when it was left in a room or in a dark place.

Thereafter, the sheet was removed and sunlight was irradiated. As a result, the handwriting was changed from blue to violet by ultraviolet rays contained in sunlight. This state was maintained without discoloring when it was left outdoors, in a room or in a dark place.

Example 9

Preparation of Ink for Color-Memorizing Photochromic Writing Instrument

An ink for a color-memorizing photochromic writing instrument comprising 6.3 parts of microcapsule slurry (solid content: 27.3%) of a microcapsule pigment (average particle diameter; 2.5 μm) in which a diarylethene photochromic compound A (1,2-bis(2,4-dimethyl-5-phenyl-3-thienyl)-3,3,4,4,5,5-hexafluorocyclopentene) which reversibly changes color from colorless to blue was encapsulated with an epoxy resin film by a known interfacial polymerization method/0.7 part of aluminum paste (trade name: 96-2104, manufactured by Toyo Aluminium KK.), 15.0 parts of glycerin, 0.3 part of succinoglycan (organic acid-modified heteroglycan composed of glucose unit and galactose unit), 0.3 part of sodium omadine (trade name: Topside 280, manufactured by Permachem Co.), 1.0 part of an amine salt of EDTA (trade name; Chelest M-50, manufactured by Chelest Co.), 3.0 parts of α-cyclodextrin (trade name: Dexy Pearl K-100, manufactured by Ensuiko Seito Co.), 0.3 part of triethanolamine and 73.3% water was prepared.

As a result of measuring the viscosity of the ink at 25° C. with an EMD viscometer, it was 1400 mPa·s at a measuring rotation rate of 1 rpm, and 44 mPa·s at a measuring rotation rate of 100 rpm, and the shear-thinning index n was 0.25. In addition, the light reflectance of the vehicle film obtained by removing the microcapsule slurry from the ink was 50% at 400 nm and 40% at 350 nm.

Preparation of Color-Memorizing Photochromic Writing Instrument

The ink, which was allowed to develop blue in advance by ultraviolet ray irradiation, was filled in a ballpoint pen refill in which a stainless steel ballpoint pen tip holding a ball with a diameter of 0.7 mm was fitted and attached to one end of a light-shielding ink container made of polypropylene, and an ink follower was injected at the rear end of the ink. Then, the ballpoint pen refill was installed in a light-shielding tubular member, whereby a color-memorizing photochromic writing instrument (ballpoint pen) was obtained.

Preparation of Color-Changing Means

A sheet (color-changing means) was prepared by cutting a transparent and colorless polyester resin film having an ultraviolet ray-absorbing ability.

A color-memorizing photochromic writing instrument set was obtained by combining the ballpoint pen and the sheet.

When writing was carried out on a writing paper with the ballpoint pen, a blue handwriting in which silver was sparsely observed could be formed. The handwriting was not discolored even in a dark place, that is, it was not discolored in normal using conditions.

Subsequently, the sheet was placed on the paper on which the blue handwriting in which silver was sparsely observed was formed and sunlight was irradiated. Ultraviolet rays contained in sunlight were shielded by the sheet, and light other than these (visible light) was irradiated, therefore, the writing image was gradually discolored to a state in which only silver was sparsely observed. This state was maintained without discoloring when it was left in a room or in a dark place.

Thereafter, the sheet was removed and sunlight was irradiated. As a result, the handwriting was changed from the state in which only silver was sparsely observed to a state in which the handwriting was blue and silver was sparsely observed therein by ultraviolet rays contained in sunlight. This state was maintained without discoloring when it was left outdoors, in a room or in a dark place.

Example 10

Preparation of Ink for Color-Memorizing Photochromic Writing Instrument

A shear-thinning color-memorizing photochromic ink comprising 44.0 parts of microcapsule slurry (solid content: 27.3%) of a microcapsule pigment (average particle diameter; 2.5 µm) in which a diarylethene photochromic compound A (1,2-bis(2,4-dimethyl-5-phenyl-3-thienyl)-3,3,4,4,5,5-hexafluorocyclopentene) which reversibly changes color from colorless to blue was encapsulated with an epoxy resin film by a known interfacial polymerization method, 0.33 part of xanthan gum (a shear-thinning material), 32.8 parts of water, 11.0 parts of urea, 11.0 parts of glycerin, 0.55 part of a nonionic permeability imparting agent (trade name: Nopco SW-WET-366, manufactured by San Nopco Co.), 0.13 part of a modified silicone defoamer (trade name: Nopco 8034, manufactured by San Nopco Co.) and 0.13 part of a fungicide (trade name: Proxel XL-2, manufactured by Zeneca Co.) was prepared.

As a result of measuring the viscosity of the ink at 25° C. with an EMD viscometer, it was 1020 mPa·s at a measuring rotation rate of 1 rpm, and 84 mPa·s at a measuring rotation rate of 100 rpm, and the shear-thinning index n was 0.48. In addition, the light reflectance of the vehicle film obtained by removing the microcapsule slurry from the ink was 97% at 400 nm and 90% at 350 nm.

Preparation of Color-Memorizing Photochromic Writing Instrument

The ink, which was allowed to develop blue in advance by ultraviolet ray irradiation, was filled by suction at 0.8 g in a light-shielding ink container (pipe made of a colored resin with an inner diameter of 3 mm), which was connected to a ballpoint pen tip via a connecting member.

Incidentally, as the ballpoint pen tip, a cutting-type ballpoint pen tip in which a stainless steel ball with a size of 0.5 mm was accommodated (a moving distance in a radial direction of the ball is about 20 µm and a movable distance in an axial direction is about 70 µm) was used.

Subsequently, an ink follower (liquid stopper) having viscoelasticity based on polybutene was injected from the end portion of the ink container, a light-shielding tubular member (holder made of a colored resin), a mouth ring and a cap were installed, and then a degassing treatment was carried out by centrifugation, whereby a color-memorizing photochromic writing instrument (ballpoint pen) was obtained.

Preparation of Color-Changing Means

The lower layer of a transparent and colorless polyester resin film having an ultraviolet ray-absorbing ability was coated with an adhesive mass obtained by homogenously mixing 10 parts of an adhesive resin (trade name: Nissetsu PE-154, manufactured by Nippon Carbide Industries Co.), 5 parts of ethyl acetate and 5 parts of toluene with a bar coater, and dried by heating to form an adhesive layer, whereby a label (color-changing means) was prepared.

A color-memorizing photochromic writing instrument set was obtained by combining the ballpoint pen and the label.

When writing was carried out on a paper with the ballpoint pen, a blue handwriting could be formed. The handwriting was not decolored even in a dark place, that is, it was not decolored in normal using conditions.

Subsequently, the label was attached on the paper on which the blue handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the label was removed and sunlight was irradiated. As a result, the handwriting was changed from colorless to blue by ultraviolet rays contained in sunlight. This state was maintained without discoloring when it was left outdoors, in a room or in a dark place.

Example 11

Preparation of Ink for Color-Memorizing Photochromic Writing Instrument

An ink for color-memorizing photochromic writing instrument was prepared by stirring and mixing 3 parts of a diarylethene photochromic compound B (1,2-bis(5-methyl-2-phenyl-4-thiazoyl)-3,3,4,4,5,5-hexafluorocyclopentene) which reversibly changes color from colorless to pink, 7 parts of a ketone-formaldehyde resin (trade name: Synthetic Resin SK, manufactured by Huels Co.), 10 parts of an acrylic copolymer emulsion (trade name: Primal ASE-60, Manufactured by Rohm & Haas Co.), 2 parts of polyoxyethylene alkyl ether phosphate (trade name: Plysurf A207H, manufactured by Daiichi Kogyo Seiyaku Co.), 5 parts of benzyl alcohol and 71 parts of ethyl alcohol.

The light reflectance of the vehicle film obtained by removing the diarylethene photochromic compound B from the ink was 96% at 400 nm and 80% at 350 nm.

Preparation of Color-Memorizing Photochromic Writing Instrument

The ink, which was allowed to develop pink in advance by ultraviolet ray irradiation, was filled in a ballpoint pen refill in which a stainless steel ballpoint pen tip holding a ball with a diameter of 0.5 mm was fitted and attached to one end of an ink container made of a metal via a connecting member, and an ink follower was injected at the rear end of the ink. Then, the ballpoint pen refill was installed in a tubular member made of a transparent resin, whereby a color-memorizing photochromic writing instrument (ballpoint pen) was obtained.

Preparation of Color-Changing Means

The lower layer of a transparent and colorless polyester resin film was coated with an adhesive mass obtained by homogenously dissolving and mixing 10 parts of an adhesive resin (trade name: Nissetsu PE-154, manufactured by Nippon Carbide Industries Co.), 0.2 part of a benzotriazole ultraviolet ray absorbent, 5 parts of ethyl acetate and 5 parts of toluene with a bar coater, and dried by heating to form an adhesive layer, whereby a label (color-changing means) was prepared.

A color-memorizing photochromic writing instrument set was obtained by combining the ballpoint pen and the label.

When writing was carried out on a paper with the ballpoint pen, a pink handwriting could be formed. The handwriting was not decolored even in a dark place, that is, it was not decolored in normal using conditions.

Subsequently, the label was attached on the paper on which the pink handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the label was removed and sunlight was irradiated. As a result, the handwriting was changed from colorless to pink by ultraviolet rays contained in sunlight. This state was maintained without discoloring when it was left outdoors, in a room or in a dark place.

Example 12

Preparation of Ink for Color-Memorizing Photochromic Writing Instrument

A flat plate was coated with microcapsule slurry of a microcapsule pigment (average particle diameter: 2.5 μm) in which a diarylethene photochromic compound A (1,2-bis(2,4-dimethyl-5-phenyl-3-thienyl)-3,3,4,4,5, 5-hexafluorocyclopentene) which reversibly changes color from colorless to blue was encapsulated with an epoxy resin film by a known interfacial polymerization method, and irradiated with ultraviolet rays, whereby the microcapsule pigment was allowed to develop blue.

Then, a shear-thinning color-memorizing photochromic ink comprising 12.0 parts (solid content) of the microcapsule pigment, which was allowed to develop blue, 0.33 part of xanthan gum (a shear-thinning material), 64.86 parts of water, 11.0 parts of urea, 11.0 parts of glycerin, 0.55 part of a nonionic permeability imparting agent (trade name: Nopco SW-WET-366, manufactured by San Nopco Co.), 0.13 part of a modified silicone defoamer (trade name: Nopco 8034, manufactured by San Nopco Co.) and 0.13 part of a fungicide (trade name: Proxel XL-2, manufactured by Zeneca Co.) was prepared.

As a result of measuring the viscosity of the ink at 25° C. with an EMD viscometer, it was 1020 mPa·s at a measuring rotation rate of 1 rpm, and 84 mPa·s at a measuring rotation rate of 100 rpm, and the shear-thinning index n was 0.48. In addition, the light reflectance of the vehicle film obtained by removing the microcapsule pigment from the ink was 97% at 400 nm and 90% at 350 nm.

Preparation of Color-Memorizing Photochromic Writing Instrument

The ink was filled in a ballpoint pen refill in which a stainless steel ballpoint pen tip holding a ball with a diameter of 0.5 mm was fitted and attached to one end of an ink container made of a metal via a connecting member, and an ink follower was injected at the rear end of the ink. Then, the ballpoint pen refill was installed in a tubular member made of a transparent resin, whereby a color-memorizing photochromic writing instrument (ballpoint pen) was obtained.

When writing was carried out on a paper with the ballpoint pen, a blue handwriting could be formed. The handwriting was not decolored even in a dark place, that is, it was not decolored in normal using conditions.

Subsequently, the label (color-changing means) obtained by providing an adhesive layer on the lower layer of a transparent and colorless polyester resin film having an ultraviolet ray-absorbing ability was attached on the paper on which the blue handwriting was formed and sunlight was irradiated. Ultraviolet rays contained in sunlight were shielded by the sheet, and light other than these (visible light) was irradiated, therefore, the writing image was gradually discolored to colorless. This state was maintained without discoloring when it was left in a room or in a dark place.

Thereafter, the label was removed and sunlight was irradiated. As a result, the handwriting was changed from colorless to blue by ultraviolet rays contained in sunlight. This state was maintained without discoloring when it was left outdoors, in a room or in a dark place.

While the invention has been described in detail and with reference to specific embodiments thereof, it will be apparent to one skilled in the art that various changes and modifications can be made therein without departing from the scope thereof.

This application is based on Japanese patent application No. 2004-267639 filed on Sep. 15, 2004, Japanese patent application No. 2005-229656 filed on Aug. 8, 2005 the entire contents thereof being hereby incorporated by reference.

What is claimed is:

1. A color-memorizing photochromic writing instrument, which comprises:
   a writing tip portion connected directly or via a connecting member to a light-shielding tubular member or refill,
   a color-memorizing photochromic ink,
   wherein the ink is prepared by dissolving, dispersing or suspending a diarylethene photochromic compound as a photochromic agent in a vehicle containing at least a solvent and a binder,
   wherein the diarylethene photochromic compound is in a coloring state.

2. The color-memorizing photochromic writing instrument according to claim 1, wherein the vehicle has a light reflectance of a dry coating film in the wavelength range from 350 nm to 400 nm of 20% or more.

3. The color-memorizing photochromic writing instrument according to claim 1 or 2, wherein the photochromic agent is a microcapsule pigment in which the diarylethene photochromic compound is encapsulated or a resin particle containing the diarylethene photochromic compound.

4. The color-memorizing photochromic writing instrument according to claim 3, wherein the writing tip portion is a marking pen tip made of a fiber work, and
   wherein a water-soluble polymer flocculating agent for suspending the microcapsule pigment in which the diarylethene photochromic compound is encapsulated, or the resin particle containing the diarylethene photochromic compound in a mildly cohesive state is contained in the color-memorizing photochromic ink.

5. The color-memorizing photochromic writing instrument according to claim 4, wherein an ink absorber made of a fiber bundle is contained in the tubular member, and the ink absorber is impregnated with the color-memorizing photochromic ink.

6. The color-memorizing photochromic writing instrument according to claim 1, wherein a non-photochromic dye or pigment is contained in the color-memorizing photochromic ink.

7. The color-memorizing photochromic writing instrument according to claim 6, wherein the pigment is a luster pigment.

8. The color-memorizing photochromic writing instrument according claim 1, wherein the writing tip portion is a ballpoint pen tip, and a shear-thinning imparting agent is contained in the color-memorizing photochromic ink.

9. The color-memorizing photochromic writing instrument according claim 1, which further comprises a light-shielding cap.

10. A color-memorizing photochromic writing instrument set, which comprises:
    a color-memorizing photochromic writing instrument according to claim 1, and
    a color-changing means for erasing a handwriting formed with the writing instrument, which contains an ultraviolet ray absorbent and/or a light-shielding pigment for shielding at least ultraviolet rays.

11. The color-memorizing photochromic writing instrument set according to claim 10, wherein the color-changing means is a sheet prepared by integrally blending the ultraviolet ray absorbent and/or the light-shielding pigment for shielding ultraviolet rays with a transparent substrate, or a sheet prepared by providing a printing or coating layer in which the ultraviolet ray absorbent and/or the light-shielding pigment for shielding ultraviolet rays is fixed in a binder resin in a dissolved or dispersed state on a surface of a transparent substrate.

12. The color-memorizing photochromic writing instrument set according to claim 11, wherein an adhesive layer is provided on the lower layer of the sheet.

13. The color-memorizing photochromic writing instrument set according to claim 10, wherein the color-changing means is prepared by providing an adhesive layer containing the ultraviolet ray absorbent and/or the light-shielding pigment for shielding ultraviolet rays on the lower layer of a transparent sheet.

14. The color-memorizing photochromic writing instrument set according to claim 10, wherein the color-changing means is a fluid in which the ultraviolet ray absorbent and/or the light-shielding pigment for shielding ultraviolet rays is dissolved or dispersed.

15. A method for alternately expressing a color-memorizing photochromic function of a writing image, which comprises:

expressing a function to alternately memorize and maintain coloring and decoloring states by arranging a color-changing means, which comprises an ultraviolet ray absorbent and/or a light-shielding pigment for shielding ultraviolet rays, cuts off ultraviolet rays of sunlight thereby effecting irradiation with visible light, in a contacted or uncontacted state to a photochromic writing image formed on a surface for writing with a color-memorizing photochromic writing instrument which comprises:

a writing tip portion connected directly or via a connecting member to a light-shielding tubular member or refill, and a color-memorizing photochromic ink wherein the ink is prepared by dissolving, dispersing or suspending a diarylethene photochromic compound as a photochromic agent in a vehicle containing at least a solvent and a binder, wherein the diarylethene photochromic compound is in the coloring state, whereby the writing image in a coloring state is changed to a decoloring state and maintained the changed state.

\* \* \* \* \*